US009609390B2

(12) United States Patent
Sirpal et al.

(10) Patent No.: US 9,609,390 B2
(45) Date of Patent: Mar. 28, 2017

(54) SYSTEM AND METHOD FOR PROVIDING CONTEXTUAL FUNCTIONALITY FOR PRESENTED CONTENT

(71) Applicants: Jamdeo Canada Ltd., Oakville (CA); Hisense USA CORP., Suwanee, GA (US); Hisense Electric Co., Ltd., Qingdao, Shangdong (CN); Hisense International Co., Ltd., Qingdao (CN)

(72) Inventors: Sanjiv Sirpal, Oakville (CA); Mohammed Selim, Oakville (CA); Alexander De Paz, Burlington (CA); Chao Zhou, Markham (CA); Todd Lee, Ancaster (CA); Cuong Hung Nguyen, Maple (CA); Salvador Guterrez, Toronto (CA); Saulo Dourado, Oakville (CA); Sepideh Shahi, Toronto (CA)

(73) Assignees: Jamdeo Canada Ltd., Ontario (CA); Hisense USA Corp., Suwanee, GA (US); Hisense Electric Co., Ltd., Qingdao, Shandong (CN); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 14/505,459

(22) Filed: Oct. 2, 2014

(65) Prior Publication Data
US 2015/0100982 A1    Apr. 9, 2015

Related U.S. Application Data

(60) Provisional application No. 61/886,241, filed on Oct. 3, 2013.

(51) Int. Cl.
*H04N 5/445* (2011.01)
*H04N 21/482* (2011.01)
(Continued)

(52) U.S. Cl.
CPC ....... *H04N 21/482* (2013.01); *H04N 21/4126* (2013.01); *H04N 21/42209* (2013.01); *H04N 21/43615* (2013.01); *H04N 21/6587* (2013.01)

(58) Field of Classification Search
CPC ............ H04N 21/482; H04N 21/6587; H04N 21/4126; H04N 21/42209; H04N 21/43615
See application file for complete search history.

(56) References Cited

U.S. PATENT DOCUMENTS

| 2012/0162536 A1* | 6/2012 | Sibilsky | .................. G06F 3/033 348/734 |
| 2012/0324495 A1* | 12/2012 | Matthews, III | ...... H04H 60/372 725/14 |

* cited by examiner

Primary Examiner — Yassin Alata
(74) Attorney, Agent, or Firm — Troutman Sanders LLP

(57) ABSTRACT

The present disclosure relates to systems, methods, electronic devices and applications for presentation and control of content. In one embodiment, a method for presentation of a user interface associated with content presented by a display device includes running an application by a device, wherein the application is configured to present a user interface based on content displayed by a display device, and receiving data from the display device, wherein the data is associated with content displayed by the display device. The method also includes presenting a user interface on the device by the application based on data received from the display device, wherein graphical elements and functions of the user interface are presented based on content displayed by the display device, and wherein graphical elements of the user interface are selectable to generate commands for the display device.

21 Claims, 37 Drawing Sheets

(51) Int. Cl.
*H04N 21/6587* (2011.01)
*H04N 21/41* (2011.01)
*H04N 21/422* (2011.01)
*H04N 21/436* (2011.01)

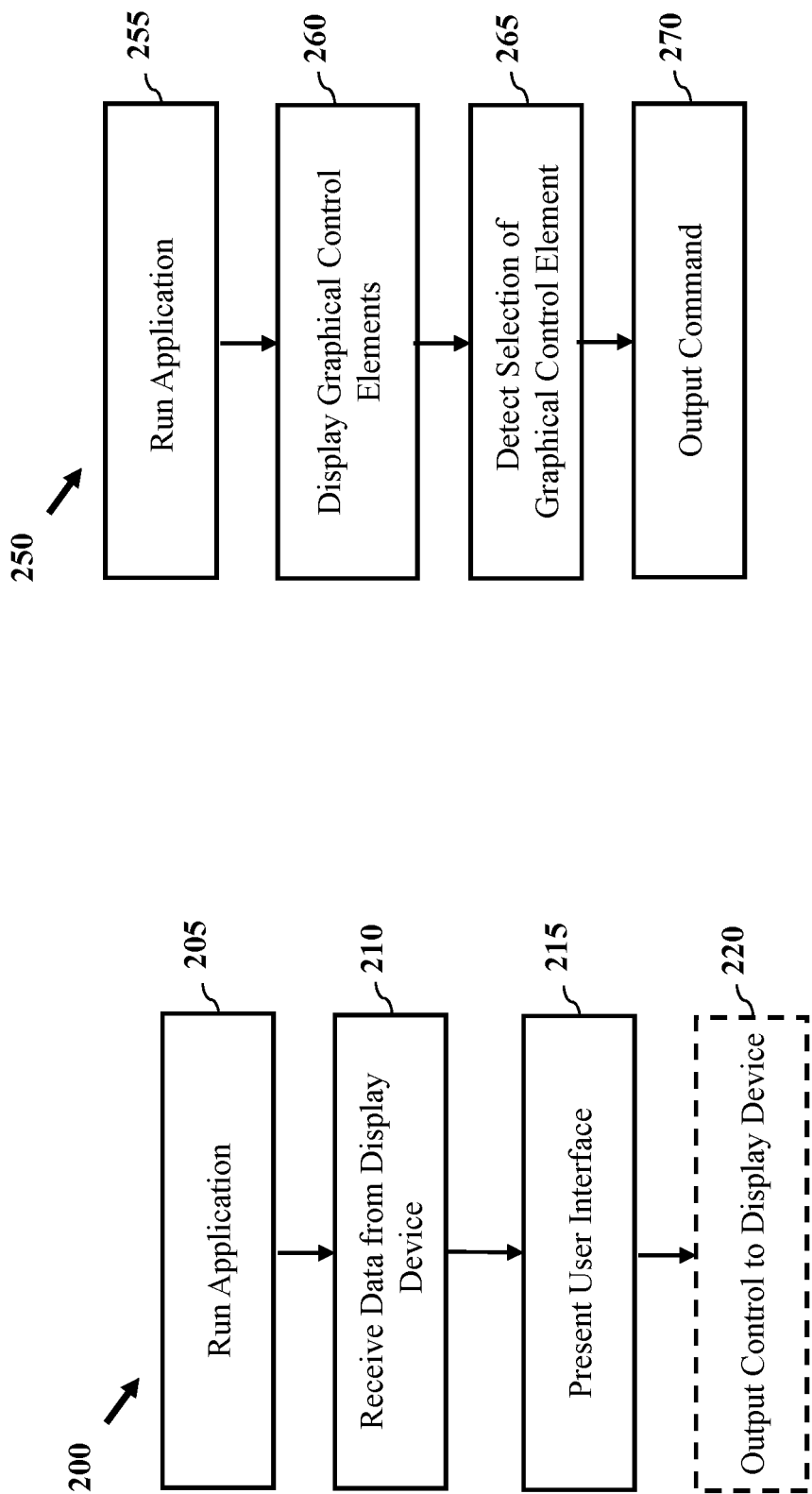

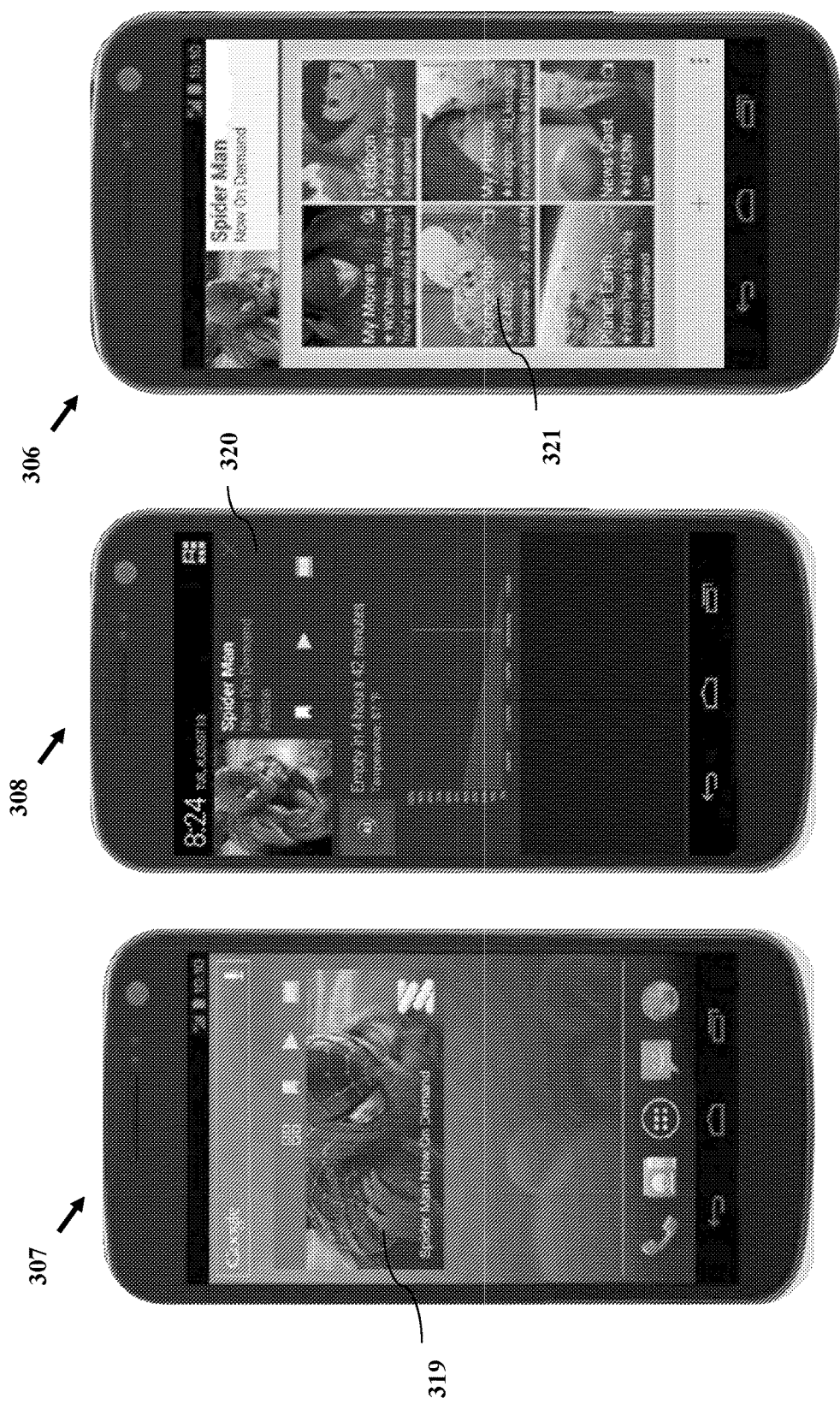

SYSTEM AND METHOD FOR PROVIDING CONTEXTUAL FUNCTIONALITY FOR PRESENTED CONTENT

PRIORITY

This application claims priority to U.S. Provisional Application No. 61/886,241 titled Device and Method for Multi-screen Experience and filed on Oct. 3, 2013, the content of which is expressly incorporated by reference in its entirety.

FIELD

The present disclosure relates to electronic devices and applications, and more particularly to systems, methods for display and content presentation devices.

BACKGROUND

Television receivers have long been used to present broadcast TV content. Control commands of remote controls and on screen commands of TVs are often limited and can be cumbersome to operate. Often, television receivers are limited in the information that may be provided with a program. For example, an electronic program guide is typically the only source of information and it is limited to broadcast content. Even then, the information provided is typically a short description of broadcast TV content only. Access to information via a display device is usually limited and hard to reach. There is a need for systems and methods to provide information and control for content accessible to display devices.

BRIEF SUMMARY OF THE EMBODIMENTS

Disclosed and claimed herein are methods, devices and systems for presentation of a user interface associated with content presented by a display device. One embodiment is directed to a method for presentation of a user interface associated with content presented by a display device. The method includes running an application by a device, wherein the application is configured to present a user interface based on content displayed by a display device, and receiving, by the device, data from the display device, wherein the data is associated with content displayed by the display device. The method also includes presenting a user interface on the device by the application based on data received from the display device, wherein graphical elements and functions of the user interface are presented based on content displayed by the display device, and wherein graphical elements of the user interface are selectable to generate commands for the display device.

In one embodiment, the application is a spring application configured to pair the device with the display device, and to provide commands to the display device based on operation of a user interface presented on the device.

In one embodiment, running the application includes executing the application to initiate pairing of the device with the display device.

In one embodiment, the application provides contextual functionality by tailoring functions of the application and presentation of graphical elements based at least in part on one or more of a particular content title and a type of media associated with the content title.

In one embodiment, receiving data includes receiving metadata for active content presented by the display device.

In one embodiment, presenting the application includes presenting one or more graphical elements to provide quick access to playback of content on the display device.

In one embodiment, presentation of the application includes configuration of the user interface based on one or more contextual features associated with content presented by the display device, wherein contextual information for content displayed by the display device is presented as information elements on the device by the application.

In one embodiment, presentation of the application includes a presentation of a plurality of graphical elements that are selectable to initiate playback of a particular content title stored as a bookmark for the application.

In one embodiment, the method further includes outputting a control command by the application for the display device to control operation of the display device, wherein the control command is generated based on a detected user input to the application on the device.

In one embodiment, the method further includes storing at least one of image and media data by the application on the device, wherein the at least one image and media data generated from content presented by the display device.

Another embodiment is directed to a system including a display device configured to present content and a device coupled to the display device. The device is configured to run an application, wherein the application is configured to present a user interface based on content displayed by a display device, and receive data from the display device, wherein the data is associated with content displayed by the display device. The device is also configured to present a user interface by the application based on data received from the display device, wherein graphical elements and functions of the user interface are presented based on content displayed by the display device, and wherein graphical elements of the user interface are selectable to generate commands for the display device.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIG. 2A depicts a process for presentation of a user interface according to one or more embodiments;

FIG. 2B depicts a process for user interface commands according to one or more embodiments;

FIGS. 3A-3I depict graphical representations of exemplary features of a spring application according to one or more embodiments;

DETAILED DESCRIPTION OF THE EXEMPLARY EMBODIMENTS

Overview and Terminology

Figure 1:
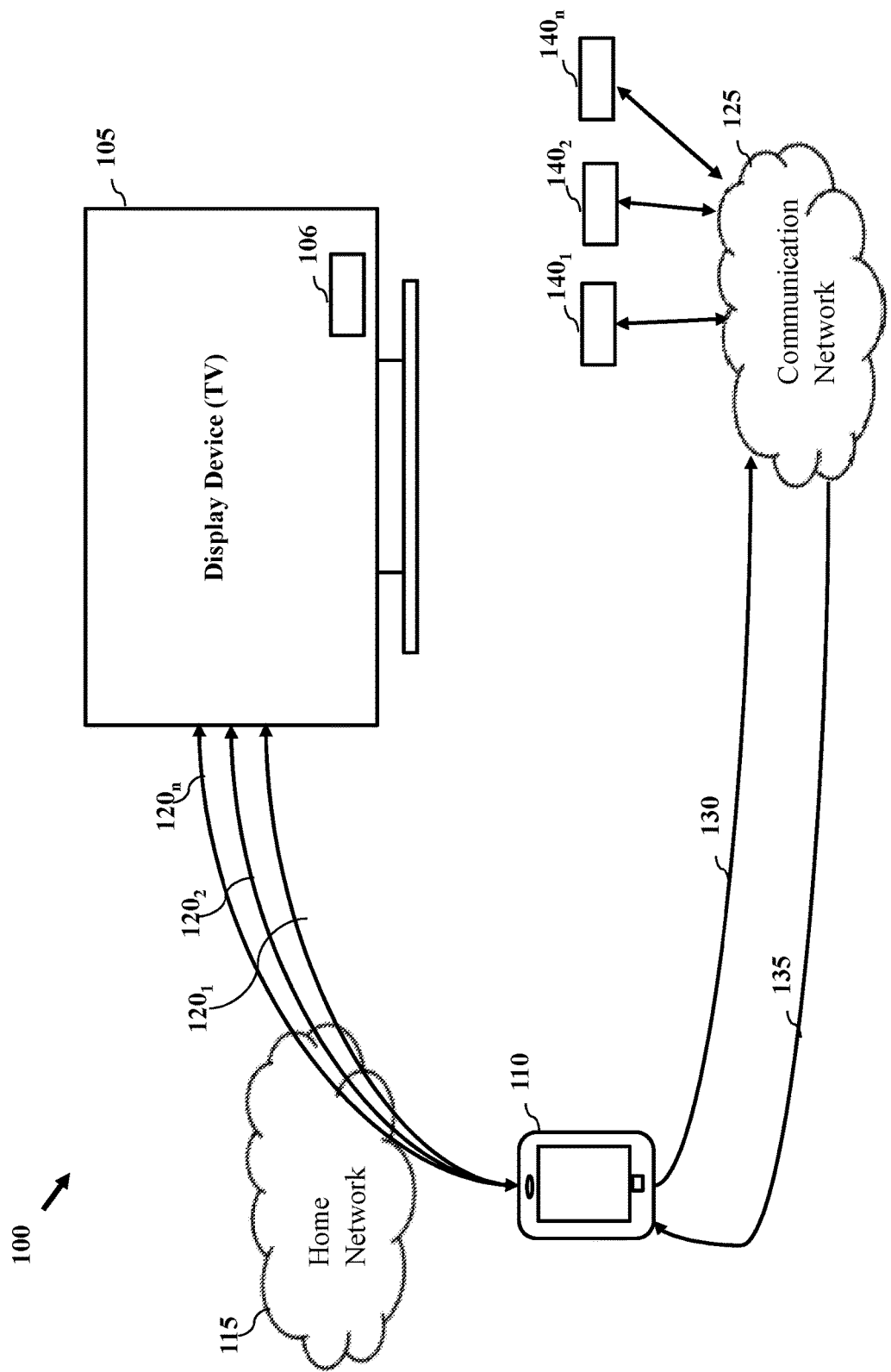
FIG. 1 depicts a simplified system diagram according to one or more embodiments.

One aspect of the disclosure is to provide a system, method, devices and applications for providing content or information on a device, the content associated with media presented by a display device. In one embodiment, a spring application is provided to allow for one or more concurrent users, or deices, to connect to a display device (e.g., TV, etc.) and gain access to contextual functionality based on active content. The spring application may be an application (e.g., "app") that provides dynamic, content centric and content aware functionality to a companion device. The spring application may be aware of content that is active on a display device and thus, can offer contextual information and functionality to a user that is tailored to the user experience. Embodiments of the disclosure are directed to functionality of a spring application and presentation of a spring application on a device. References to a tandem application or tandem functionality, as used herein, are interchangeable with a spring application or spring features.

In one embodiment, a spring application is provided. The spring application may be content or media focused. By way of example, the spring application may allow for information to be provided and/or presented by a device (e.g., mobile device, tablet, etc.) wherein the information, controls and presentation are formatted based at least in part on content presented by a display device. The spring application can beneficially allow for taking advantage of the personal nature of connected devices. The spring application may offload contextual tasks to appropriate devices. The spring application may be an extension of a display device, such as a TV. The spring application may offer a natural application to match user expectations. The spring application may be configured to allow multiple users to act upon viewed content. The spring application may interoperate with TV software systems, such as the Cinesense™ platform and user interfaces to allow for GTV4.0 platforms.

Another aspect of the disclosure is directed to a framework, such as a spring framework, that is running on a display device that allows for one or more applications executed by one or more mobile devices to connect to the display device, receive information associated with active content of the display device and send instructions to the display device based on the content.

Contextual panels may relate to one or more tailored configurations based on the type of content and applicability of commands to the type and content title. By way of example, content panels may be provided to include commands that may be used to operate or control playback of media. A spring application will avoid or not present panels for functions or features that do not apply to the type of content or that cannot be used with the type or title of content.

Contextual functionality allows for functions of the user interface to be tailored to one or more of functions of the application and presentation of graphical elements. By way of example, based on the type of content or media presented by a display device, the user interface may modify the type of information, the presentation of information, the playback controls, the availability of playback controls, etc. In addition to changing which functions are available, display features may be tailored to the particular type of content to provide contextual content. For example, display attributes may differ for live or broadcast TV content in comparison to music content presented by a display device.

As used herein media may relate to one or more sources, or silos, of content of a display device, and content presented by the display device. Content may include video data, broadcast or live TV data, video on demand (VOD), content stored by a media center of the display device, music data, album data, image data, photo album data, a particular input source and applications that may be run or executed by a display device. References herein to active content refers to content that is displayed or presented by a display device, or content associated with a particular silo that the display device is currently tuned or set to.

In addition to providing information associated with media and/or content displayed by a display device, a spring application can provide one or more control functions and formats. A launch pad may refer to an arrangement of graphical elements to be presented by the spring application, such as a grid of tiles, grid of bookmarks, or other graphical presentation that allows for selection of a particular content title, content title type or silo. A launch pad may provide quick access to content without having to navigate a menu. The launch pad may be populated by user selections and/or based on user interaction with a spring application.

A spring application may be configured to provide one or more short cuts for accessing desired content. Shortcuts may be displayed on a device such that the user may operate the device as opposed to interfacing directly with a display device. In that fashion, command operations and location of commands operations may improved by the spring application.

As used herein, a navigation drawer relates to a graphical menu that may be displayed as a layer or display feature over a user interface presentation, wherein elements of the drawer may be selected to allow for navigation of the user interface and/or control of a display device.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a simplified system diagram of system 100 according to one or more embodiments. System 100 may be configured for presentation of media by display device 105 and presentation of content associated with the media by device 110. As shown in FIG. 1, system 100 includes display device 105 and device 110. Device 110 may be configured to communicate with display device 105 by way of a network, such as home network 115, to exchange content associated with media presented by the display device 105. In one embodiment, one or more types of content, shown as $120_{1-n}$ may be provided to device 110 by display device 105. In addition to content, metadata, contextual information, screen grabs, and other forms of data may be provided from the display device 105 to the device 110. According to another embodiment, communication and presentation of content $120_{1-n}$ may be performed by an application executed by device 110. Device 110 may be configured to execute a spring application or tandem application according to one or more embodiments.

Display device 105 includes a display configured to present media and content, such as one or more of video, image data, text data, and music data (e.g., audio, artist name, album, song name, album, audio data, etc.). According to one embodiment display device 105 may be configured to provide content to a mobile device, such as device 110, based on execution of an application (e.g., app) by display device 105. Display device 105 may be configured to receive media from one or more sources. Display device 105 may be a television. In one embodiment, display device 105 includes a controller 106 to run an application. Controller 106 may be coupled to the display unit of display device 105. In one embodiment, controller 106 is configured to run an application for the display device 105, the application configured to provide active content to one or more devices, such as device 110, associated with the application. Controller 106 may also present a graphical display on the display device 105.

Device 110 may be a mobile device or tablet executing an application, such as the content sharing application executed by display device 105. Although FIG. 1 depicts one device 110, it should be appreciated that system 100 and the application for content sharing may allow for multiple devices to communicate and interoperate with display device 105. Device 110 may include a display and interface (e.g., touch screen, inputs, etc.) to allow for presentation of content according to one or more embodiments. In certain embodiments, the spring application may vary in presentation for smaller mobile devices compared to tablets, which may include additional graphical elements compared to layout presentations for mobile devices.

According to one embodiment, device 110 may be configured to execute an application configured to provide one or more spring or tandem features as described in provisional application No. 61/886,241 titled Device and Method for Multiscreen Experience which is incorporated herein by reference. References to spring features may be interchangeable with references to tandem features as used herein. According to one embodiment, spring features may be associated with a spring application. In one embodiment, a spring application is integrated with and/or interoperates with the operational platform of controller 106 of display device 110. In that fashion, a spring application of device 110 may be configured to interoperate with a spring application of display device 105 and/or a media presentation platform of display device 105.

According to one embodiment, content $120_{1-n}$, which may be content, metadata and/or contextual information related to active content, may be provided to device 110 based on what is being presented by display device 105. According to another embodiment, the spring application run by display device 105 will provide data or content to device 110 each time the presentation of content by display device 105 changes. Device 110 may receive content $120_{1-n}$ including meta-data and query for detail information based on an HTTP REST interface.

According to one embodiment, system 100 may provide a spring framework. By way of example, display device 105 may run a spring application that allows for one or more applications executed by one or more mobile devices, such as device 110, to connect to the display device 105, receive information associated with active content of the display device 105 and send instructions/commands to the display device 105 based on the content. The spring application may provide a real-time look into the active media context of a display device 105, the media context defining a mode or output configuration for viewing apps, TV programs, videos, music, images, etc. Using contextual knowledge, the spring application can present an app on a mobile device or user device (separate from the display the device) with a variety of sub-contexts relative to active content displayed by the display device 105. Sub-context data and content may allow a user to discover more information about media presented by display device 105, take action against the content (e.g., playback control), modify attributes of the content (e.g., watched status, favorites, etc.) and/or share content with others (e.g., share, share to X, etc.).

According to one embodiment, device 110 is configured to run an application, such as a spring application, wherein the application is configured to present a user interface based on content displayed by display device 105, and receive data from the display device 105, wherein the data is associated with content displayed by display device 105. The device 110 is also configured to present a user interface by the application based on data received from the display device 105, wherein graphical elements and functions of the user interface are presented based on content displayed by the display device 105, and wherein graphical elements of the user interface are selectable to generate commands for the display device 105.

In certain embodiments, device 110 may request metadata for content and/or supplemental content over communication network 125 from one or more third parties $140_{1-n}$. Third parties $140_{1-n}$ may relate to one or more content providers or servers. Requests 130 and responses 135 may be based on an HTTP REST interface between device 110 and third parties $140_{1-n}$.

A spring application can provide one or more features for device 110 and/or display device 105. In one embodiment, a spring application can allow for a device 110 to discover and connect to display device 105. For example, this feature allows the spring application to search network 115 to connect to display device 105. Connecting to display device 105 may include an authentication step to ensure that only authorized devices can access content of display device 105.

In one embodiment, a spring application can allow for a device 110 to show active context information. For example, this feature provides a real-time feed between display device 105 and the spring application. Using the feed, display device 105 informs the spring application every time the media context of display device 105 changes. Such changes can include switching between inputs, sources or silos, and watching video in a media center or launching an application from an application center of display device 105. In another embodiment, a spring application allows for active context information to be shown as a collection. For example, this feature allows users to view an active collection, where the collection is a logical grouping of multiple pieces of content, such as photo albums, music albums and music playlists.

In one embodiment, a spring application can allow for a device 110 to provide context history. For example, this feature tracks the last predetermined number of contexts that the user has expressed interest in. A user can express interest in particular media or context information based on activating a sub-context. According to one embodiment, sub-context information can be provided for content information from display device 105. As such, the user of a spring application can view information and/or metadata about active content as known by the display device 105. For example, for a live TV channel that a user may view the channel information (e.g., name, call letters, channel number, etc.) and program information (e.g., name, description, start time, duration, etc.). Sub-context information can be provided from content information from an external source. Using this feature, device 110 may reach out to one or more third parties $140_{1-n}$ to learn more information about a particular piece of content or media presented by display device 105. Sub-context information playback controls can be provided for a single piece of media. For example, using the playback sub-context, device 110 may be operated to control the playback of active content by display device 105 based on the media or content type. For music, for example, playback controls can include play, pause, forward, rewind, etc. For Photos or image data, there may not be any playback controls. For video content, playback controls may be play, pause, forward, rewind, etc. For TV channels or broadcast media, the playback controls may be channel changing controls.

According to another embodiment, sub-context information playback controls can be provided for a media collection. For example, using the playback sub-context, device 110 may be operated to control the playback of an active collection based on the collection type. For photo albums/slideshows, for example, playback controls can include start/stop, previous, next, play etc. For music albums, for example, playback controls can include previous, next, and set playback order (repeat pattern, song order—shuffle, play, etc.). For music playlists, for example, playback controls can include previous, next, and set playback order (repeat pattern, song order-shuffle, re-order, remove from playlist, play from, etc.).

In one embodiment, a spring application can allow for a device 110 to provide springmarks. For example, this feature allows users to personalize the spring application by saving specific context information that can later be activated by the user take the user directly to the content on display device 105.

In one embodiment, a spring application can allow for a device 110 to provide tasks for favorites and watched. For content marked as a favorite, spring application allows the user to set the active context as a favorite item on display device 105. The favorite feature only applies to media contexts that can be set as a favorite. By way of example, apps may not be able to be made favorite in certain embodiments, while video content may be. The watched task allows the user to alter the "watched" status of active content on display device 105. This feature may be set to only apply to media content that supports a watched indicator.

In another embodiment, a spring application allows for sub-context sharing. For example, the spring application can allow users to share information about active content with either a particular social network or through general sharing (e.g., SMS/MMS, email, electronic messaging, etc.).

In another embodiment, a spring application allows for a task feature to enable or disable subtitle and closed captioning. For example, users of device 110 can turn on/off the subtitles or closed captioning tracks for active content using the spring application. The sub-context may only apply to media contexts that support subtitling or closed captioning. In another embodiment, a spring application allows for a task feature to block content, input or particular silos of display device 105. For example, the spring application on device 110 allows users to activate parental controls for one or more of blocking TV programming/video based on rating, blocking an active TV channel, an blocking a current input/silo.

In another embodiment, a spring application allows for sub-context data entry. For example, the spring application can be used as an input method for display device 105. When display device 105 is expecting text input, the spring application will present the user with a graphical keyboard to allow for easier data entry.

In another embodiment, a spring application allows for a task feature to provide show, hide and/or delete controls. For example, the spring application can allow a user to show, hide and/or delete the active content. These features may be limited to only media center content, but may also be used to hide particular TV channels.

In another embodiment, a spring application allows for a task feature to rename an attribute of an active media context. For example, this feature may apply to renaming an active input (e.g., HDMI to Xbox) and/or changing the title of a song playing in the media center (e.g., Track 01 to Harder to breath).

In another embodiment, a spring application allows for a task feature to take screenshots of active media. The screen shot can be saved to local storage of display device 105. The image can then be used for part of a sharing sub-context. In another embodiment, a spring application allows for a task feature to download active content from display device 105 to device 110. This feature may apply to photos, photo albums, music, music albums and videos available in the media center of display device 105.

In another embodiment, a spring application allows for a notify feature to post notifications on display device 105 to inform a user that a particular task was successfully performed. Notifications can include one or more of a share notification that a post shared to display device 105, a block notification to inform that the user that content has been blocked and parental control is enabled, and a take a screenshot notification to indicate where the screen shot was saved.

In another embodiment, a spring application allows for a search feature to provide a means for searching content of display device 105. For example, the search may include a global search across all content or a context aware search within a current context.

FIG. 2A depicts a process for presentation of a user interface according to one or more embodiments. Process 200 may be configured to present a user interface associated with content presented by a display device.

Process 200 may be initiated by a device (e.g., device 110) running an application by a device, wherein the application is configured to present a user interface based on content displayed by a display device (e.g., display device 105) at block 205. According to one embodiment, the application is a spring application configured to pair the device with the display device, and to provide commands to the display device based on operation of a user interface presented on the device. Running the application includes executing the application to initiate pairing of the device with the display device. The application provides contextual functionality by tailoring functions of the application and presentation of graphical elements based at least in part on one or more of a particular content title and a type of media associated with the content title.

At block 210, the device receives data from the display device, wherein the data is associated with content displayed by the display device. Receiving data includes receiving metadata for active content presented by the display device.

At block 215, a user interface is presented on the device by the application based on data received from the display device, wherein graphical elements and functions of the user interface are presented based on content displayed by the display device, and wherein graphical elements of the user interface are selectable to generate commands for the display device. Presenting the application includes presenting one or more graphical elements to provide quick access to playback of content on the display device. In one embodiment, presentation of the application includes configuration of the user interface based on one or more contextual features associated with content presented by the display device, wherein contextual information for content displayed by the display device is presented as information elements on the device by the application. According to another embodiment, presentation of the application includes a presentation of a plurality of graphical elements that are selectable to initiate playback of a particular content title stored as a bookmark for the application.

Process 200 may optionally include outputting a control command by the application for the display device to control operation of the display device, wherein the control command is generated based on a detected user input to the application on the device at block 220. Process 200 may also include storing at least one of image and media data by the application on the device, wherein the at least one image and media data generated from content presented by the display device.

FIG. 2B depicts a process for user interface commands according to one or more embodiments. Process 250 may be initiated by a device running an application at block 255.

At block 260, the application may be configured to load and/or store one or more bookmarks or spring marks that the application may employ for accessing content. At block 265, a device operating the spring application can detect selection of a bookmark. By way of example, a selection may relate to a touch command of the user interface. At block 270, a command may be output to a display device by the device for selection of content associated with the selection of the bookmark.

FIGS. 3A-3I depict graphical representations of exemplary features of spring application according to one or more embodiments. According to one embodiment, a display device (e.g., display device 105) may present media, such as a movie, video, image data etc., shown as 305. A spring application on a device (e.g., device 110) can present one or more graphical elements, controls, and/or display configurations in response to content 305. The spring application may display a spring home 306 on a device (e.g., device 110), which may include a launch pad to change content and/or media presented by the display device (e.g., display device 105). The spring application may display a spring widget 307 as a desktop widget and/or a spring notifications 308 depicting running activity. The spring application may display media contexts 309 in response to a selection of active media, wherein each media context has one of more sub-contexts. Media contexts 309 can include sub-context that is to be determined 310 (e.g., not yet populated by the spring application), playback sub-context 311, actions sub-context 312, information sub-context 313, sub-context to be determined 314 (e.g., media context unsynchronized with the display device). Media context history view 315 may be presented based on previously viewed media. In response to media contexts 309, the spring application may present a media tasks presentation 316 to include one or more media tasks, such as task level presentation 317. The spring application may also present a nested content presentation 318.

FIG. 3B depicts a spring widget 307 as a desktop widget including a graphical element 319 associated with media that may be selected. Graphical element 319 may be displayed by a device (e.g., device 110) based on the media that is being presented by a display device. FIG. 3C depicts spring notifications 308 depicting a notification bar 320 associated with media that may be selected. Graphical element 319 may be displayed by a device (e.g., device 110) based on the media that is being presented by a display device. FIG. 3D depicts spring home 306 include selectable elements that form a launch pad 321 to change content and/or media presented by the display device.

Figure 3A:
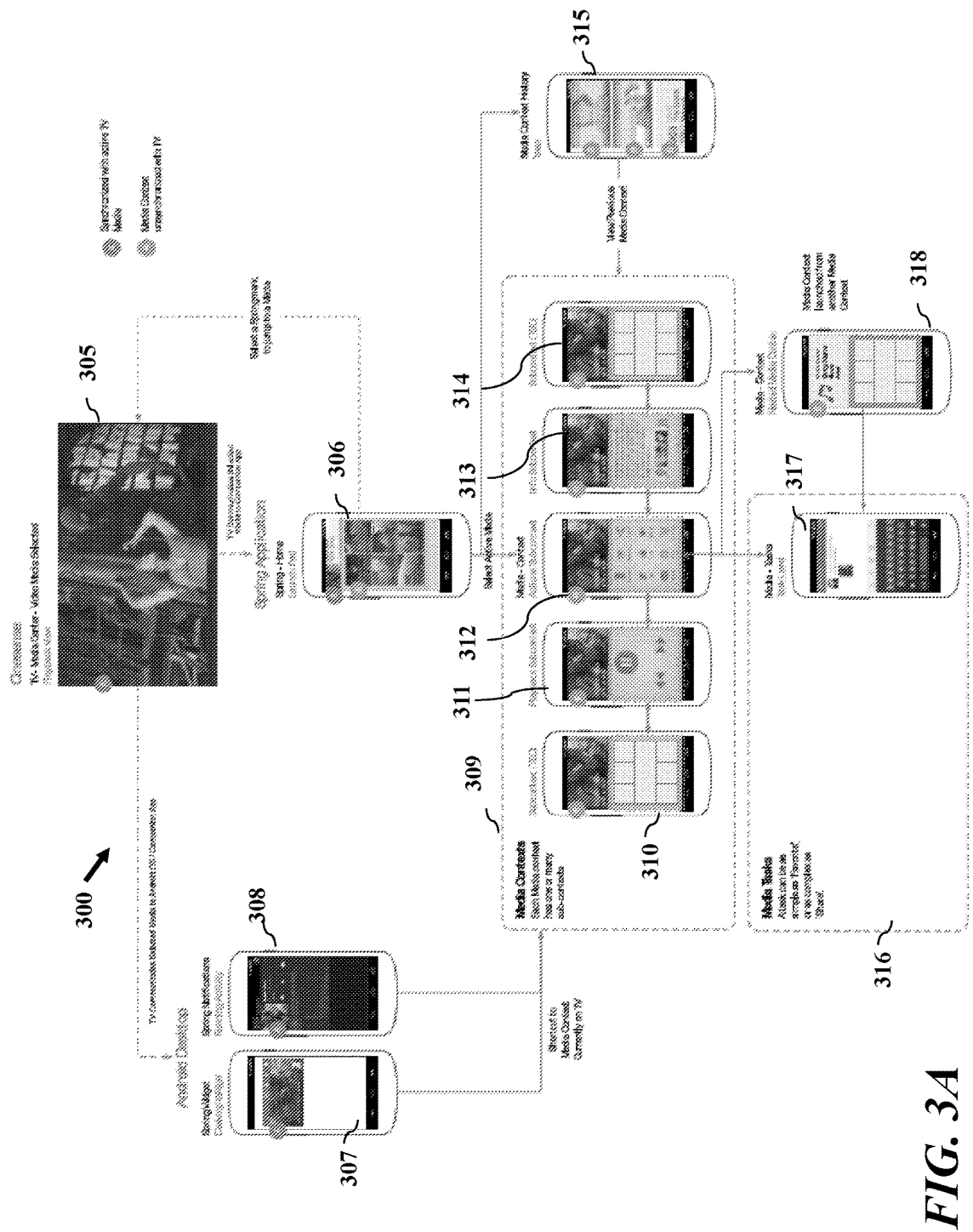
Figure 3G:
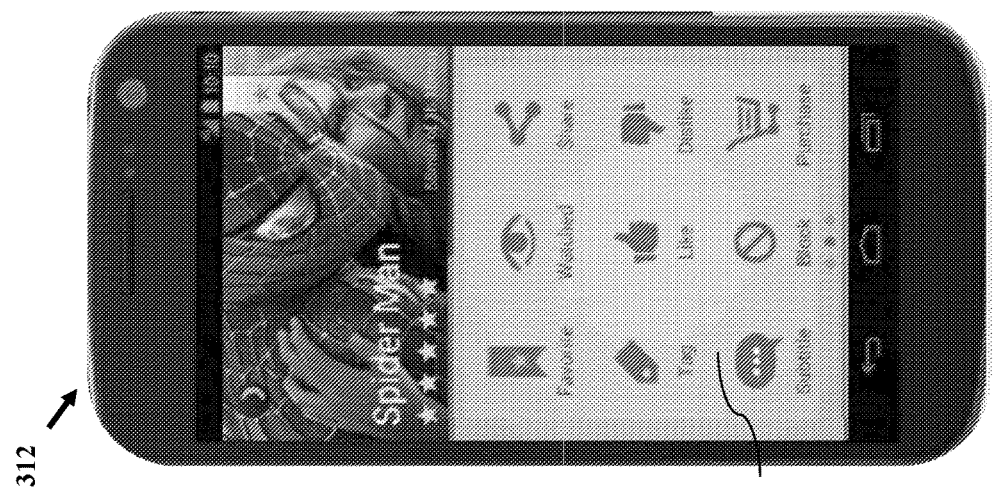
Figure 3F:
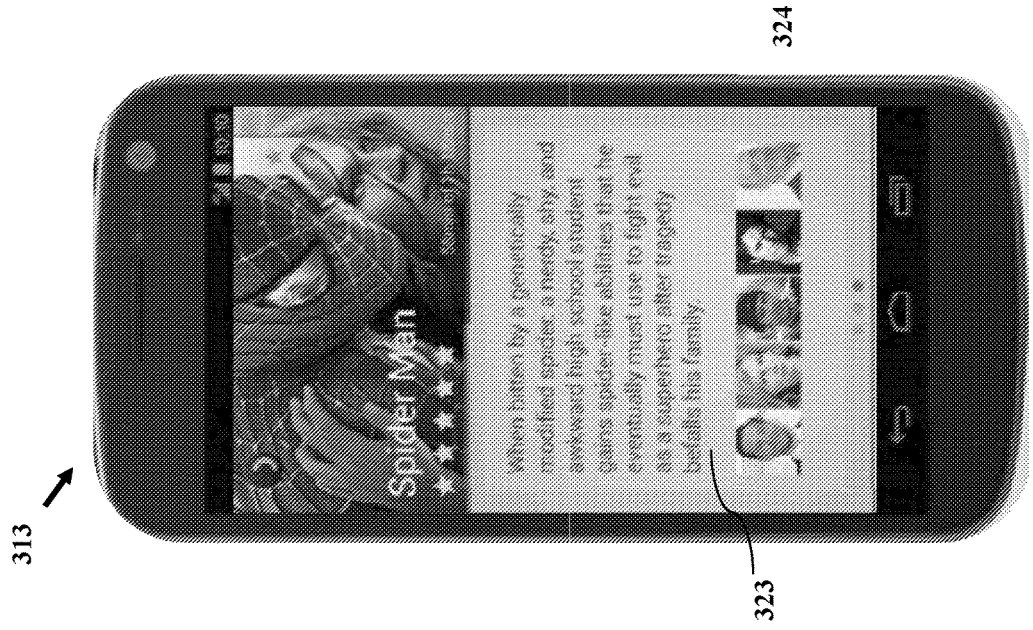
Figure 3E:
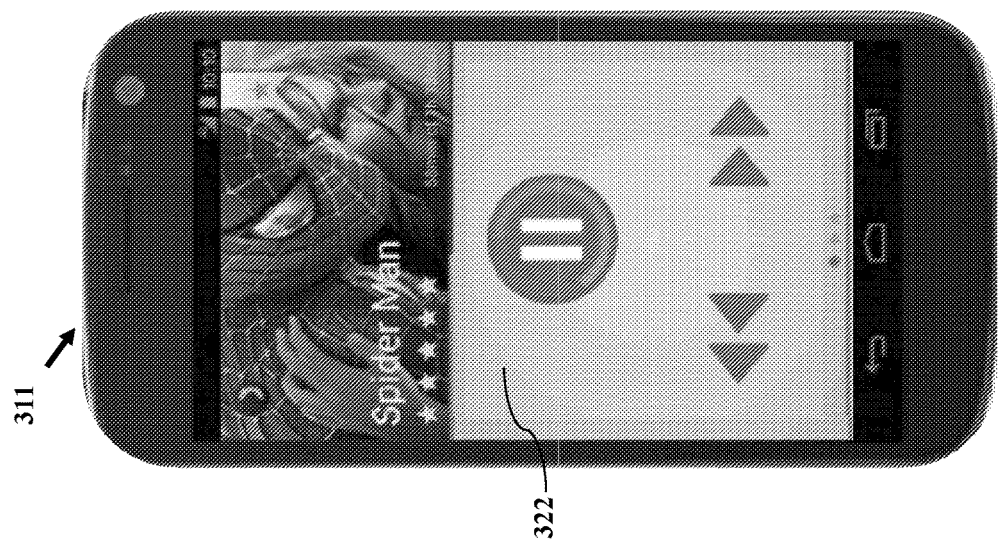
Figure 3I:
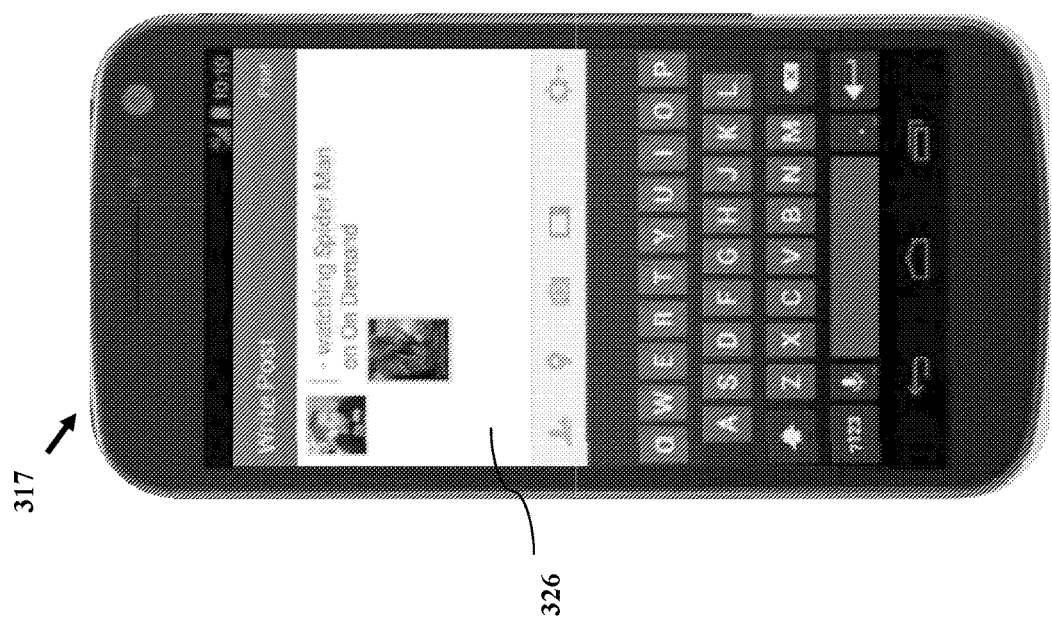
Figure 3H:
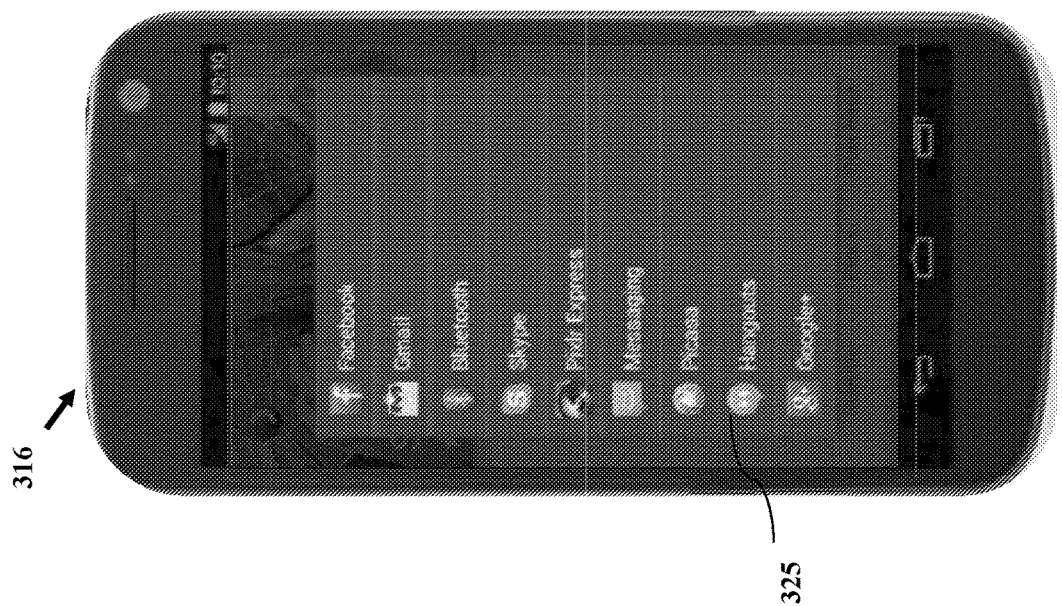

FIG. 3E depicts media content and playback sub-context 311 including playback controls 322. FIG. 3F depicts media content and information sub-context 313, the information sub-context 313 including a description of the media content 323. FIG. 3G depicts actions sub-context 312 including action elements 324. FIG. 3H depicts media tasks presentation 316 with a plurality of sharing operations 325. FIG. 3I depicts task level presentation 317 with message 326 to add a message to include with shared content.

Figure 4:
FIG. 4 depicts a graphical representation of a display device display window according to one or more embodiments.

FIG. 4 depicts a graphical representation of a display device display window 400 including a notification 405 that may be generated by the spring application on a user device and transmitted by the user device to the display device.

Figure 5:
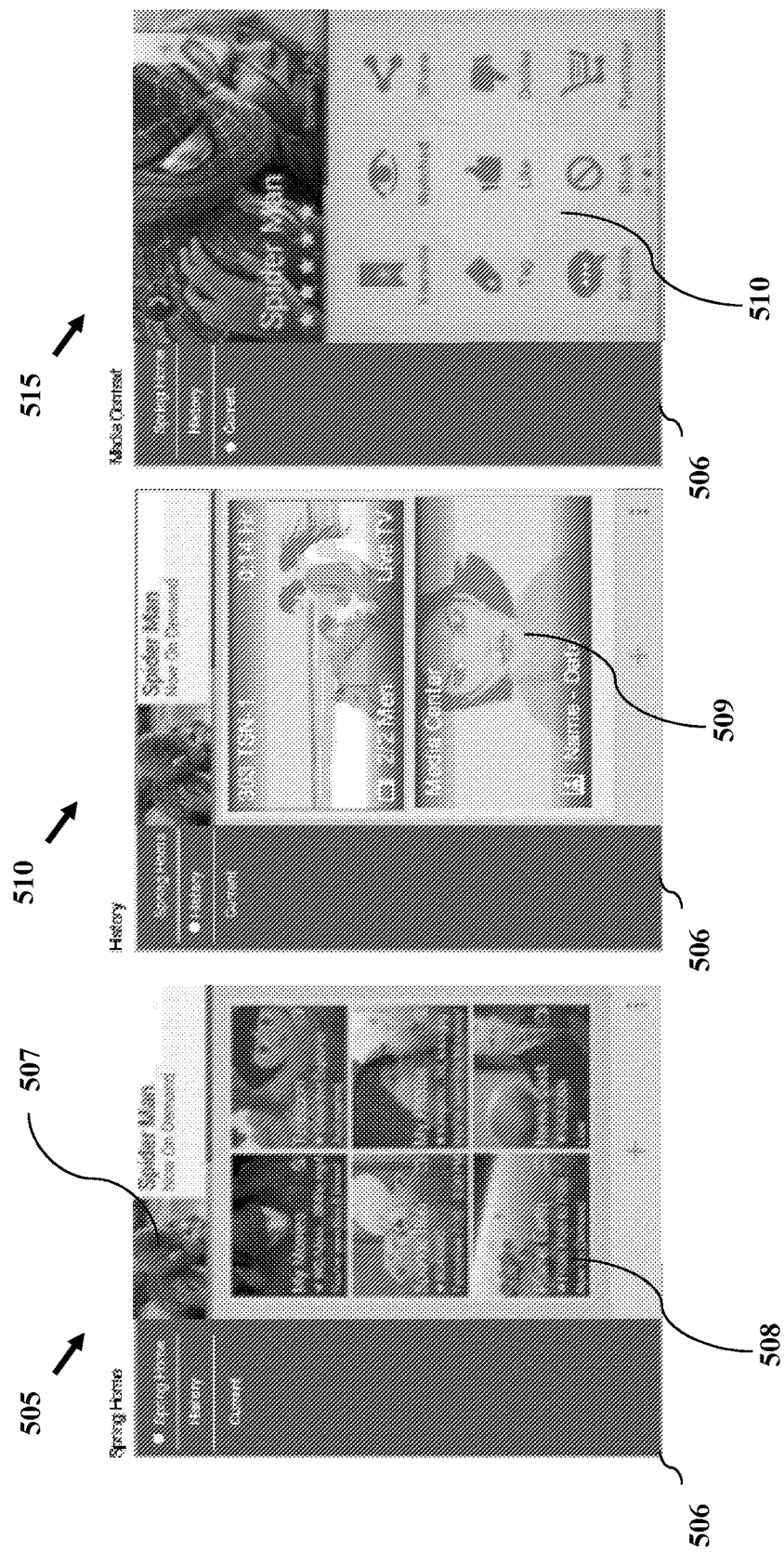
FIG. 5 depicts a graphical representation of a user interface according to one or more embodiments.

FIG. 5 depicts a graphical representation of a user interface according to one or more embodiments. Presentation of the spring application can include a spring home configuration 505 to provide a starting point for selecting or launching presentation of media or content, a history configuration 510 to show historical content, and a current configuration 515 to show active media content. Each of the spring home configuration 505, history configuration 510 and current configuration 515 can include menu bar 506 to allow for switching between configurations. Spring home configuration 505 can include a graphical element 507 indicating media content that may be viewed or that is being presented by a display device. Spring home configuration 505 includes one or more graphical elements 508 which may be associated with media titles or springmarks. History configuration 510 includes graphical elements 509 to previously viewed or accessed content. A current configuration 515 includes contextual actions 510 for the active content.

FIGS. 6A-6D depict a graphical representation of media context for a spring application according to one or more embodiments. Media context 600 may relate to different forms of media that may be presented by the display device and that may be selected, viewed, or provided contextual information by the spring application to a user device. Media context 600 includes video/image media 605, media center media 610 and input source 615.

Figure 6A:
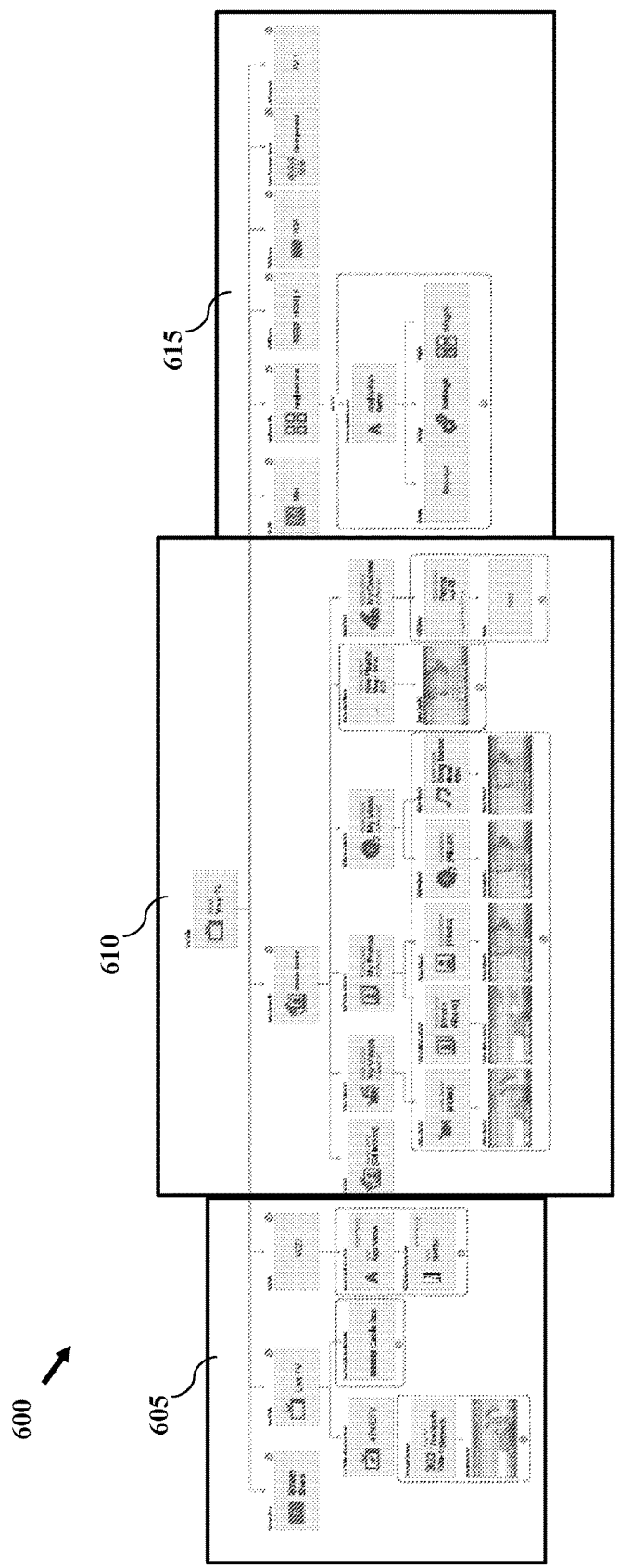
FIGS. 6A-6D depict graphical representations of media context for a spring application according to one or more embodiments.
Figure 6B:
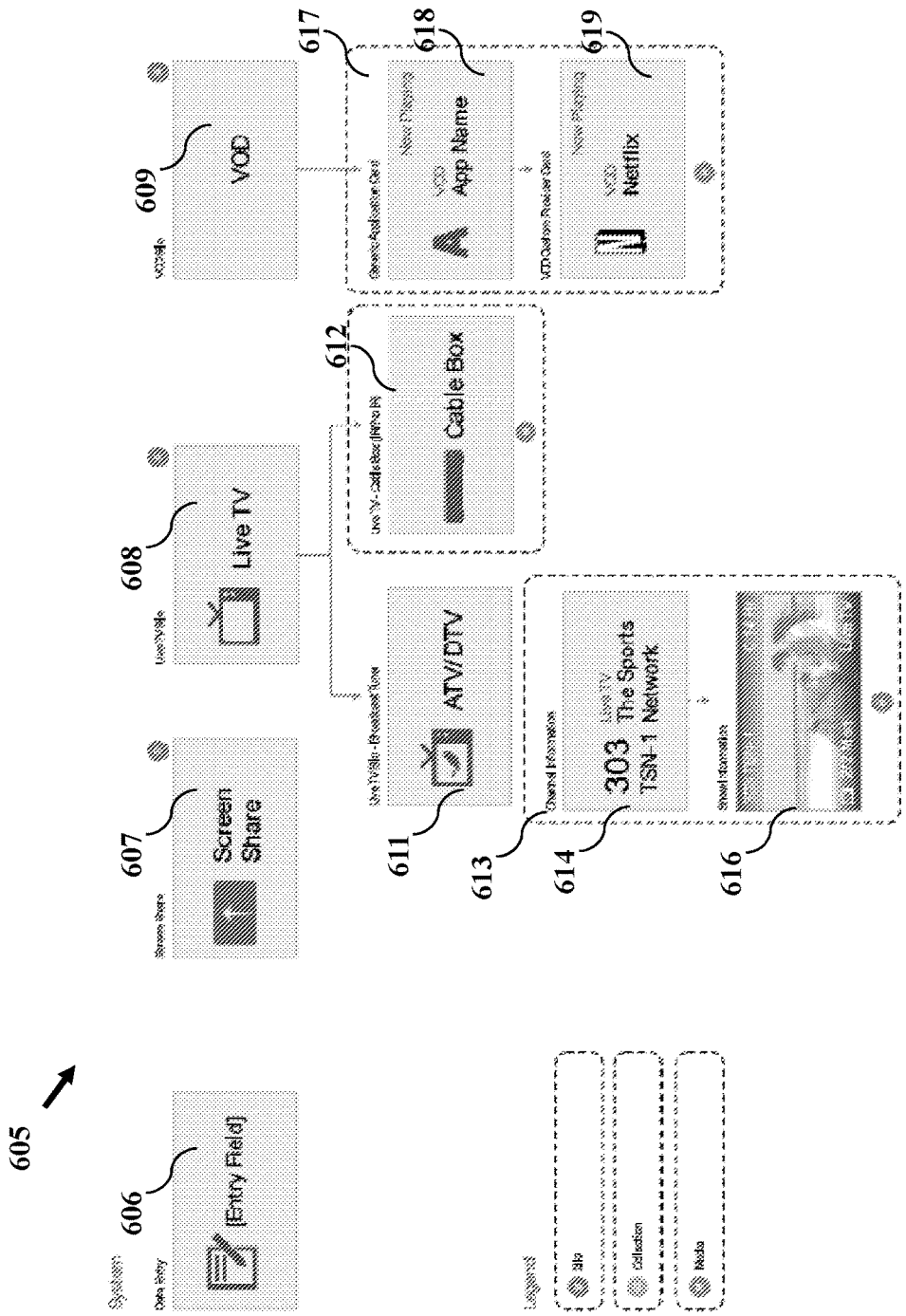

FIG. 6B depicts entry field 606 which may be used by the spring application to provide text, comments, commands and/or search terms to select media. Video/image media 605 includes screen share function 607, live TV media 608 and video-on-demand (VOD) 609. Screen share function 607 allows a user of the spring application to capture a screen shot of the display device. Live TV media 608 includes broadcast TV 611 and cable provider content 612. Live TV media 608 can include metadata 613 such as channel information 614 and shown information 616. Video-on-demand (VOD) 609 can include media sources 617 including a generic application for media 618 and a third party media provider 619.

Figure 6C:
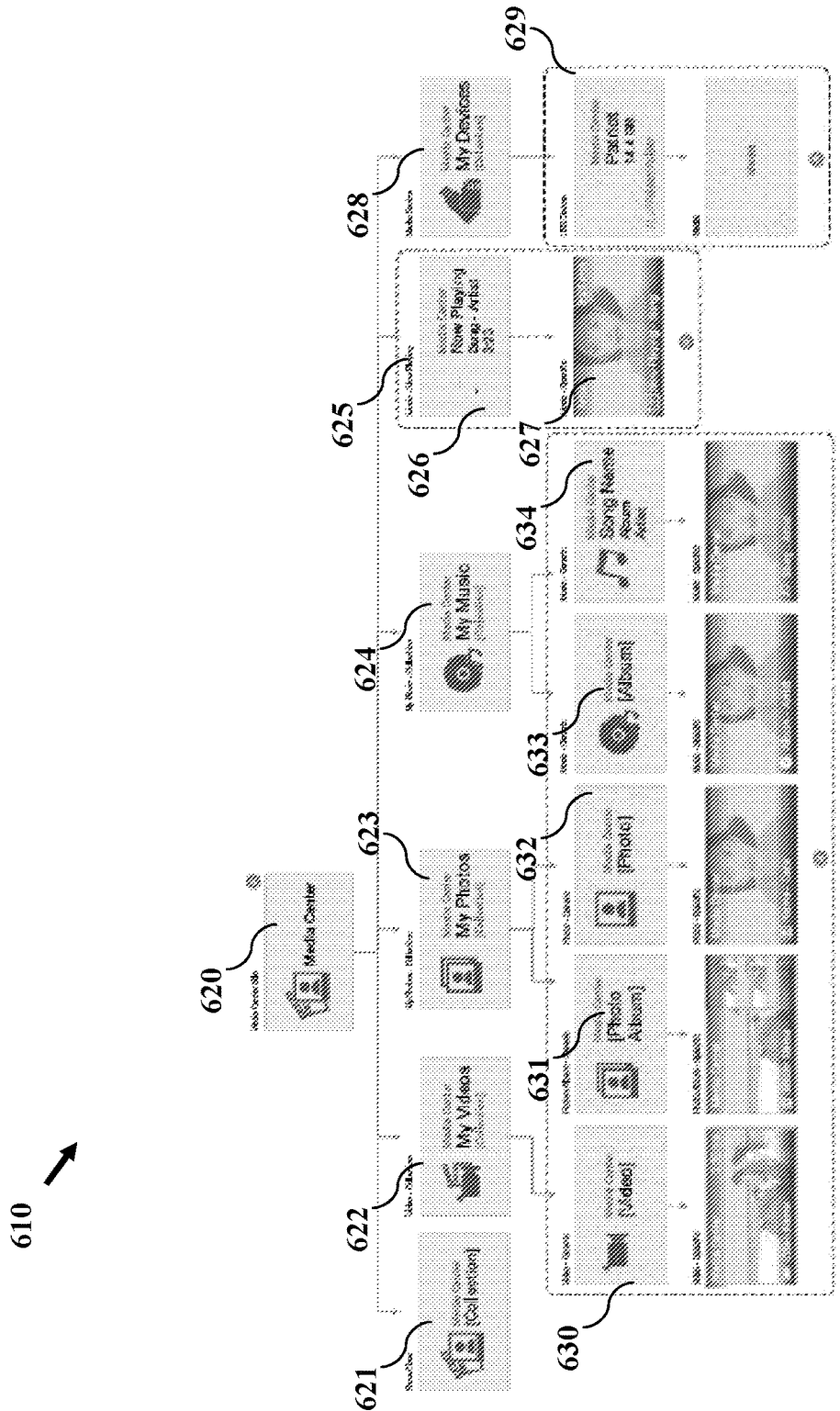

FIG. 6C depicts media center media 610 which may be associated with media center silo 620 that may provide showcase media 621 for personal media, video collection 622 for personal videos, my photos 623, my music 624, music media 625 which may provide features for music currently being played 626 and specific music 627. Media center features for connecting to other sources 628 may be associated with input sources 629 (e.g., USB, media, etc.). Video collection 622 can include features 630 associated with video playback for media in general and for specific videos. My photos 623 can include features 631 associated with image presentation for image data in general and for specific images and features 632 for photo albums. My music 624 can include features 633 associated with music playback in general and for specific music titles and features 634 for albums.

Figure 6D:
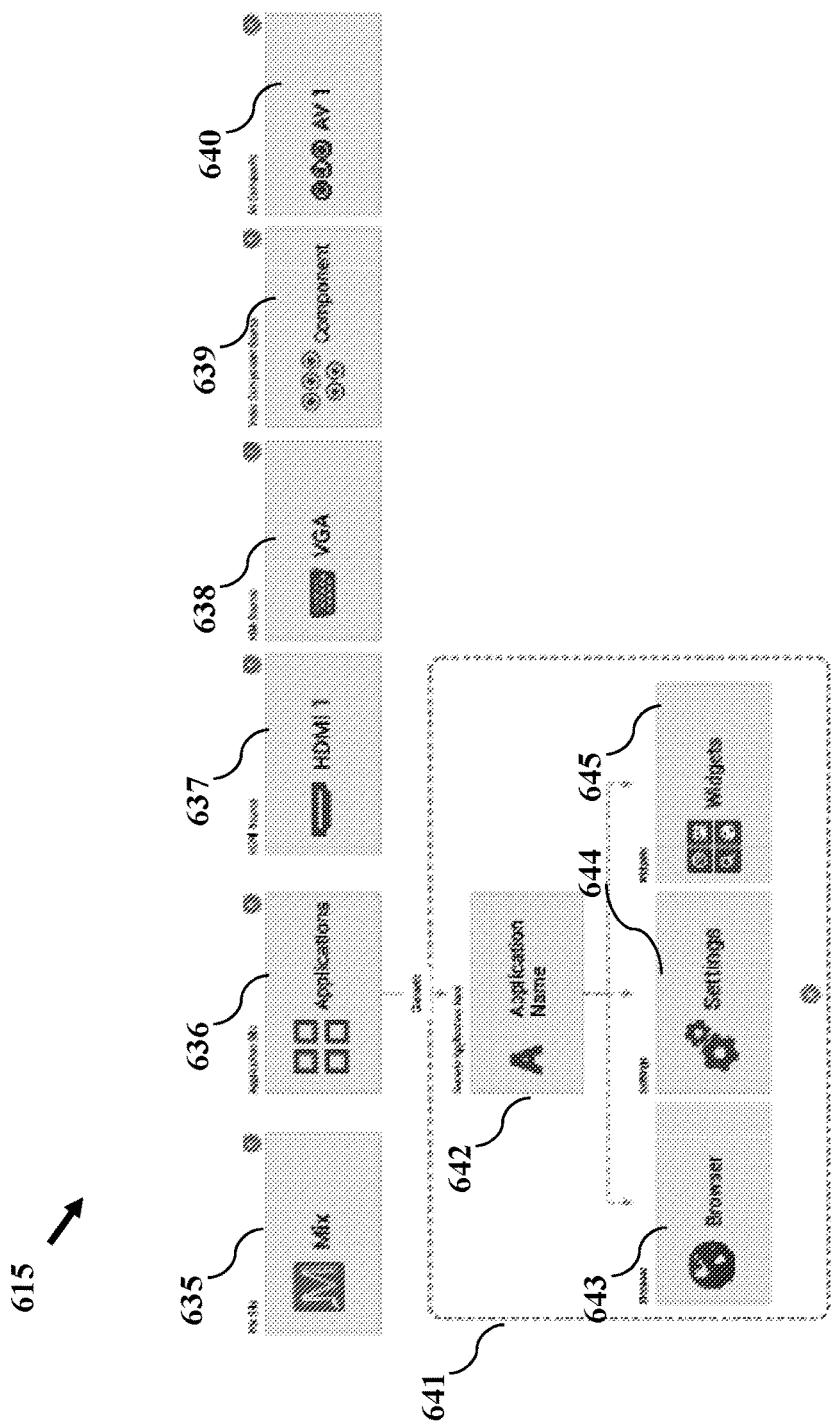

FIG. 6D depicts input sources 615 as including a mix source 635, application sources 636, HDMI source 637, VGA source 638, component source 639 and audio/video (AV) source 640. Applications 636 may include generic applications 641 providing for an application name 642, browser features 643, settings 644 and widgets 645.

Figure 7:
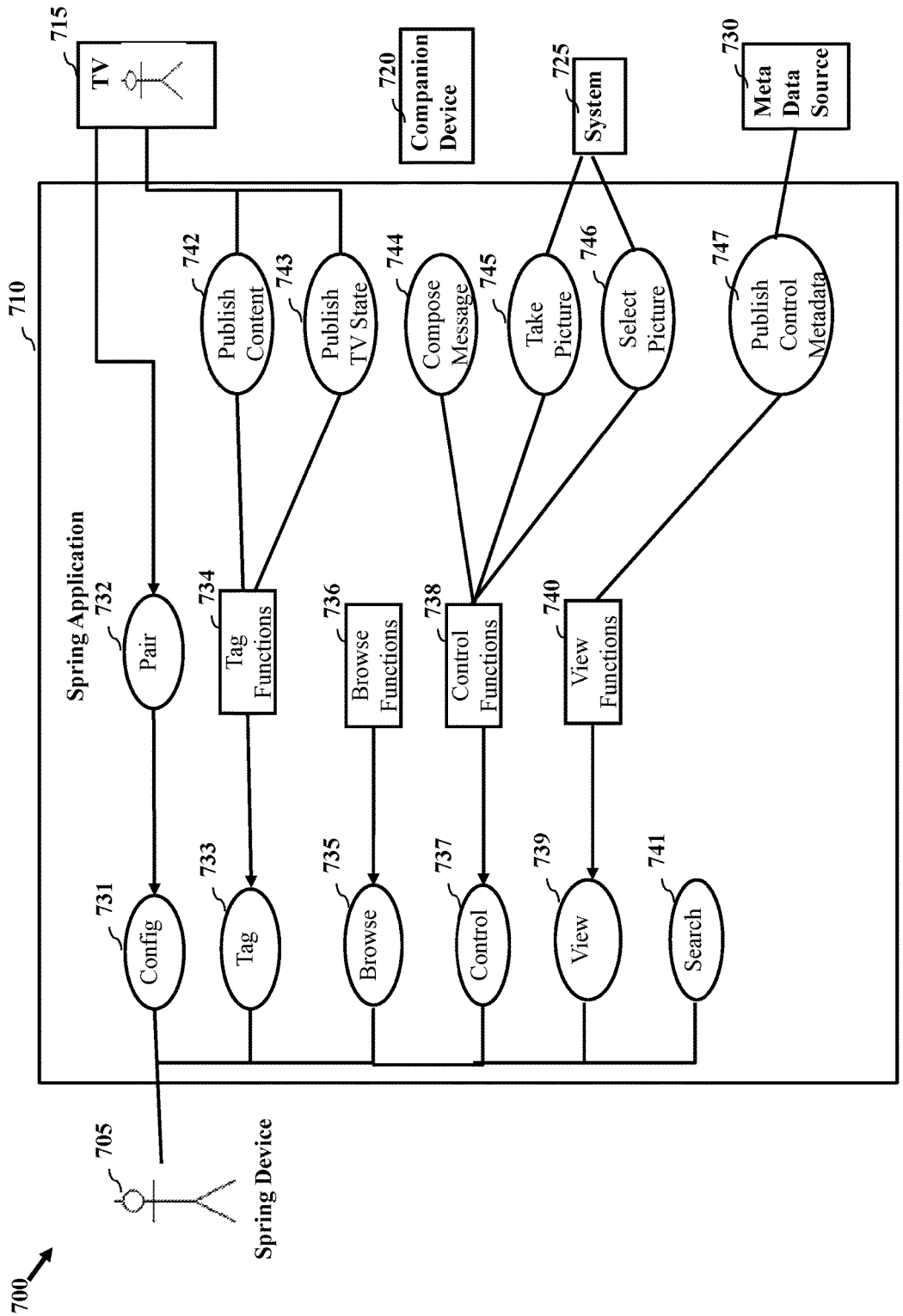
FIG. 7 depicts a graphical representation of spring application functions according to one or more embodiments.

FIG. 7 depicts a graphical representation of spring application functions according to one or more embodiments. According to one embodiment, a spring application may allow for connectivity and interoperability of a device (e.g., mobile device, etc.) and a display device (e.g., TV, etc.). FIG. 7 depicts a spring device 705, spring application 710 and display device 715. According to one or more embodiments, the spring application may also allow for connectivity with other companion devices, such as companion device 720, system 725 associated with components of a device (e.g., camera) and one or more metadata sources shown as 730. Spring application 710 may provide a plurality of functions and features.

Configuration function 731 allows for configuration of a device to allow for customization of the spring presentation and for control of the device based on one or more settings. Pair function 732 allows for a device to be paired with a display device (e.g., a Cinesense™ powered TV, etc.). Preconditions of pairing include that a spring app is installed on both a device and TV. Pair function 732 includes detecting a user command to discover one or more display devices on the same local network, the spring app displaying a list of discovered devices, detecting a user selection of a display device to pair with, the spring app prompting the user to enter an authentication and if the PIN is correct, the display device adding the device. Multiple spring applications may be paired to a single display device.

Tag 733 allows for marking media and may be associated with one or more tag functions 734. Tag function 734 allows for one or more of creating and deleting springmarks, tagging as favorite or watched, to show/hide content, to block content, and to rename input. Creating spring marks allows a user to create navigation macro/shortcuts for an item. Springmarks may be useful to avoid multi-step navigation of a user interface and can allow for taking users directly to a desired channel or content. Once created, a springmark may be saved and available for selection on a launch pad. Deleting springmarks allows for users to delete springmarks no longer desired for the spring application. Tagging as favorite allows for items, such as particular media titles or content to be marked by a user as favorite in order to quickly access content at a later time. Tagging as watched allows a viewer to quickly determine if content has already been viewed, which can be helpful to determine the next episode to watch. A show/hide content feature may be part of tag function 734 to control what content appears as part of a collection. This feature may be useful for content that is not to be shared around an entire household. Blocking content allows for blocking access to certain items, such as particular channels or applications. Renaming content allows for renaming content by displaying a keyboard/text entry panel on a device (e.g., device 110) to provide text to a display device (e.g., 105). Renaming input allows a similar approach to renaming an input to be descriptive to the device attached to it. Based on one or more tag functions 734, the spring application can provide a publish content feature 742 and/or publish TV state 743. These features may allow for sharing content, images or screen shots using a device separate from the display device.

Browse 735 allows for marking media and may be associated with one or more tag functions 734. Browse functions 734 allows for browsing spring application use history, browsing active data, and browsing a collection. The browsing spring history allows for a user to view previous spring contexts such as a list of the last number of items viewed or opened. Browse active content allows for a display device to send a spring app a notification that active content has changed in order to provide user information with active content. Browse collection allows for a user to view content associated with a collection and content within the collection.

Control 737 allows for one or more of control functions 738. Control functions 738 can include one or more of playback or playback collection, enabling subtitles, sharing, data entry, taking a screen shot, deleting content, uninstalling the spring app, launching a spring mark, and downloading content. A playback feature allows for playback controls to control active content on a display device from the spring app on a companion device. The playback controls can appear over an active content displayed by the display device to potentially obscure part of the presentation of content. The user may be able to select and control the playback from the companion device. Playback may apply to video, song, image, VoD, applications from an App Center, live TV, etc. Playback collection function allows for control of an active collection and may apply to one or more of a photo album, music album, and music playlist.

An enable subtitles feature allows for a user to enable subtitles/closed captioning through a display device using the spring application. A sharing feature of functions 738 allows for sharing messages about content being viewed. Sharing may be associated with a feature/function to compose messages 744, take pictures 745, and select pictures 746.

Data entry features provide a keyboard (e.g., displayed/graphical) to allow for data entry to the display device. Take screen shot may allow for a user to capture a screenshot of the display device from a companion device. The captured data may be shared using social media, email, etc. A delete content feature allows for users to delete content stored by a media center of a display device. An uninstall app feature allows for users to uninstall applications downloaded from an app center using the spring application. A launch spring mark allows for detection of a user selection of a springmark and launching or navigating to media associated with the springmark. A download content feature allows for a user to download active content on a display device to a companion device.

View 739 allows for users to view a current state of a display device. For example, the spring app allows the user to view on a companion device which setting or location among inputs a display device is currently presenting. View functions 740 can include functions for one or more of content information, external content information, media context and notifications. Content information functions may allow for the spring application to provide information related to active content without having to present guide or information on the display device (e.g., TV). By way of example, content information may include one or more of channel metadata, event/program metadata, music album metadata, music metadata, image metadata, photo album metadata, video metadata, device data and App metadata. A view external content information function allows for the spring application to retrieve data associated with presented media or active content from one or more third party services, such as media databases, entertainment servers, etc. External content information may be based on a publish control metadata function 747 which is configured to obtain and/or store metadata for content presented by a display device. A notification feature allows for actions taken by the spring application to be provided to the display device. In which case, the display device can acknowledge the action and present a message to the user that the action has been completed.

Search 741 allows for configuration of a device to allow for customization of the spring presentation and for control of the device based on one or more settings.

Figure 8A:
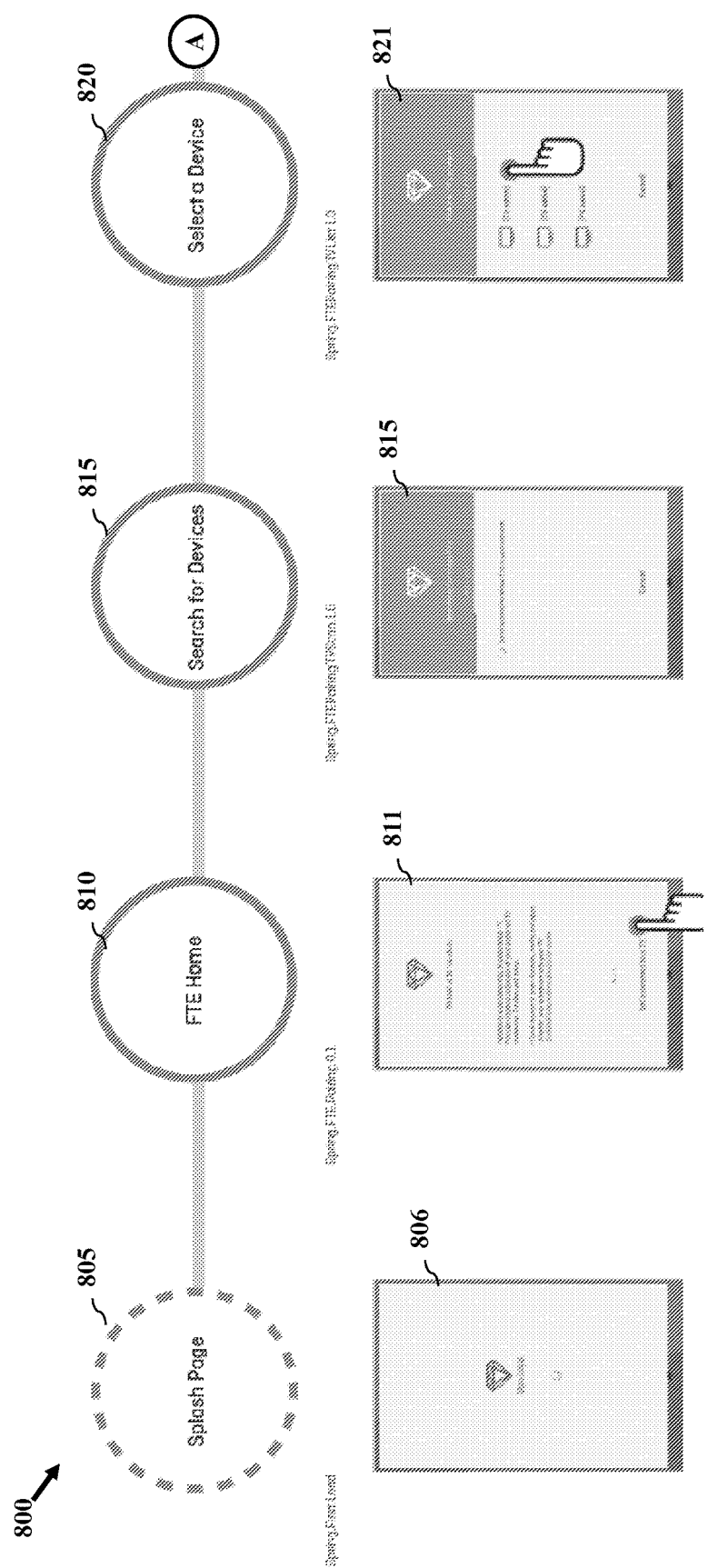
FIGS. 8A-8B depicts a process for pairing a device with a display device according to one or more embodiments.
Figure 8B:
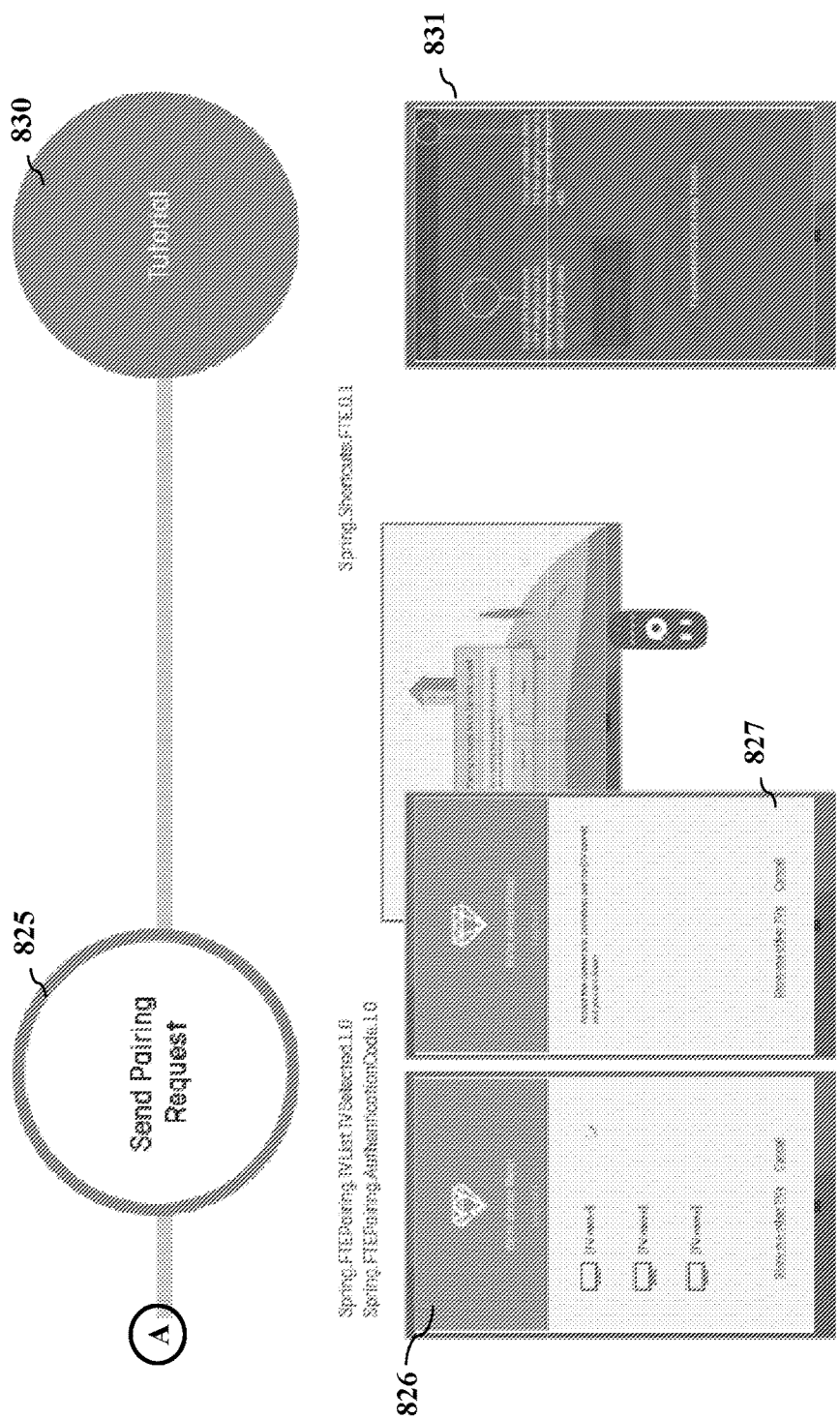

According to another aspect, the spring application may provide a user experience framework. The spring application may provide dynamic, content centric and content aware functionality. The user experience framework may provide one or more graphical elements and processes to allow for contextual presentation, navigational streamlining and FIGS. 8A-8B depicts a process 800 for pairing a device (e.g., device 110) with a display device (e.g., display device 105). At block 805, the spring application may optionally present a splash page 806 which is a start page including a logo or icon to indicate startup of the spring application. At block 810, the spring application may present a home page 811 which can include a message to pair the device with a display device. At block 815, the spring application searches for devices and presents 816 indicating that display devices are being searched over a home network. At block 820, the spring application presents page 821 allowing a user to select one or more devices for pairing to. Based on a selection detected by the spring application, a pair request may be sent at 825 and presentation of a pairing list 826 or request for authentication code 827 may be presented. In addition to the pair request, the display device may present a dialog or popup indicating that a device is trying to pair at 828. Once paired, the spring application may present an app tutorial at 830 including presentation of main functions 837.

Figure 9A:
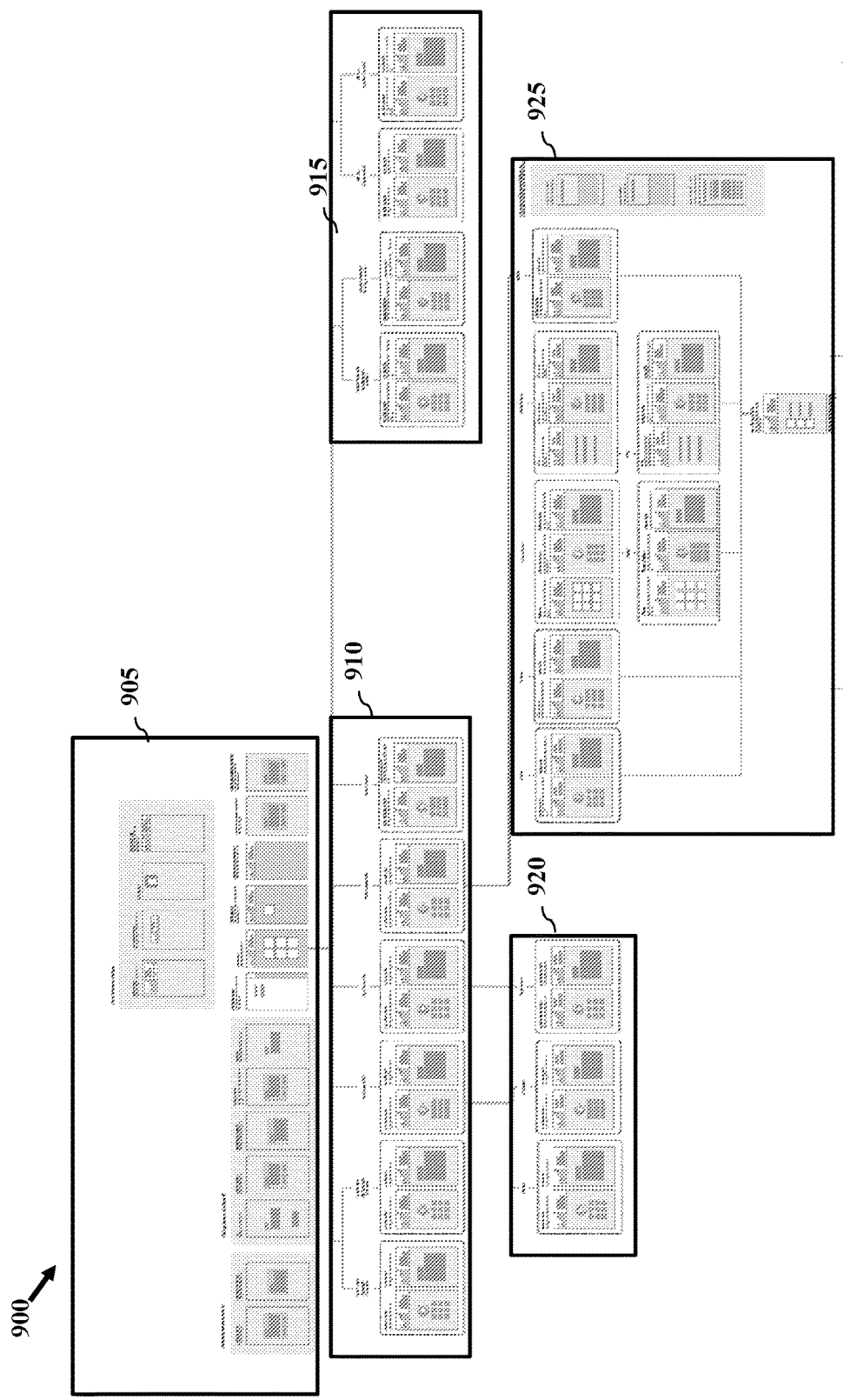
FIGS. 9A-9F depict user experience features according to one or more embodiments.

FIGS. 9A-9F depict user experience features according to one or more embodiments. FIG. 9A depicts an overview of user experience features 900 which includes entry point and launch pad features 905, media silos 910, screen share and mix silos 915, media content 920, and media center content 925. The user experience format may provide graphical elements for one or more of the user experience features.

Figure 9B:
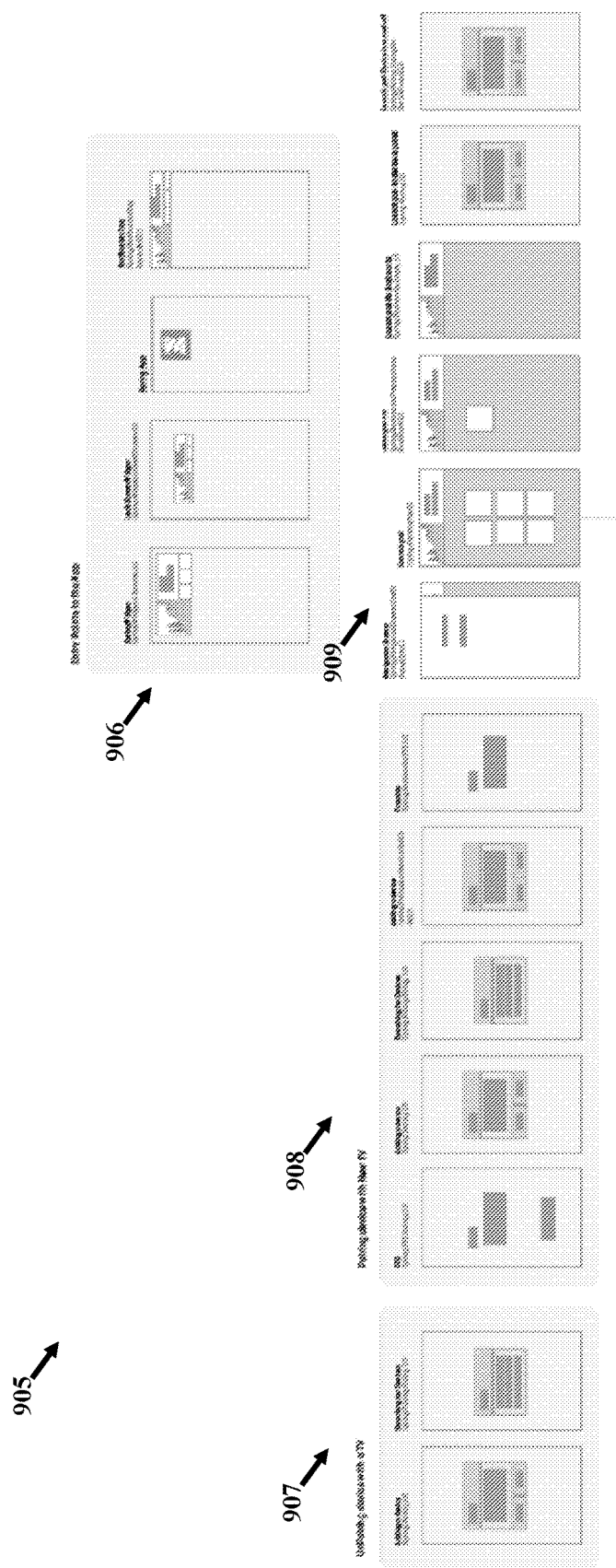

FIG. 9B depicts entry point and launch pad features 905. Entry points to the spring App 906 can include a spring widget, lock spring widget, spring app and notification tray. Unpairing device features 907 can include adding a device and searching for a device features. Pairing a device with a new TV features 908 can include FTE, adding a device and searching for a device, authentication and tutorial features. Navigation drawer features 909 can include a navigation drawer menu and one or more launchpad features.

Figure 9C:
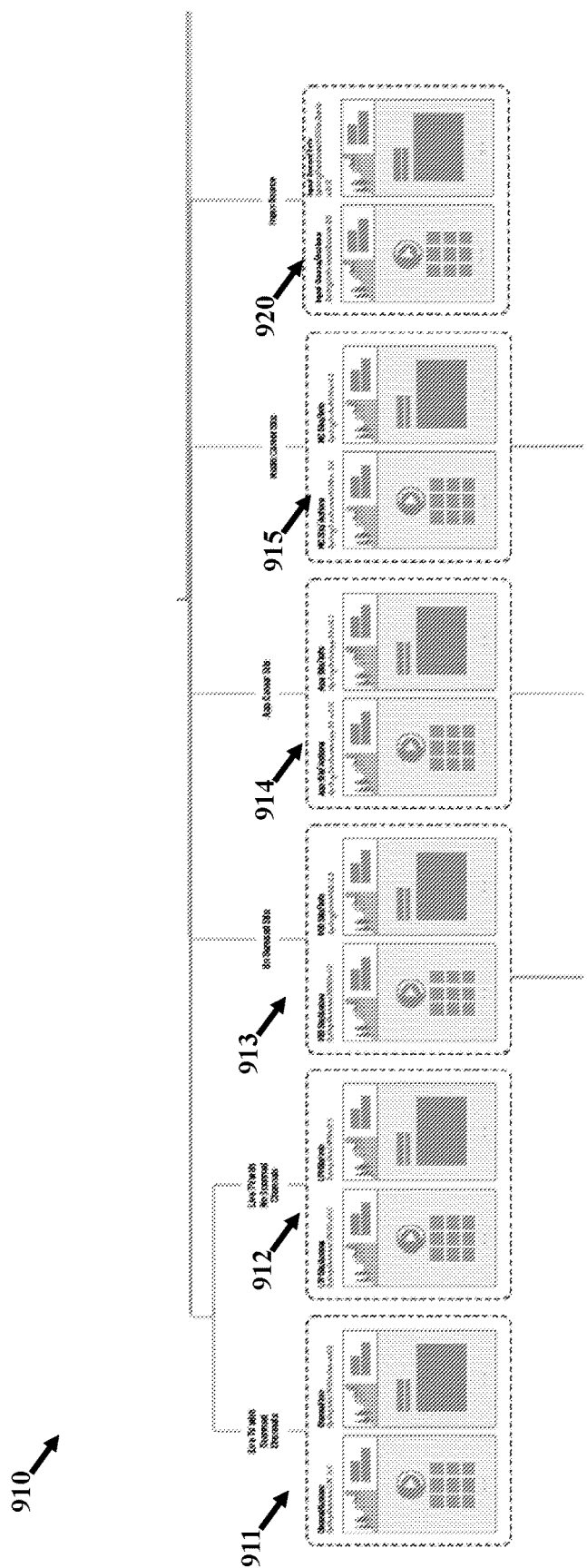
Figure 9D:
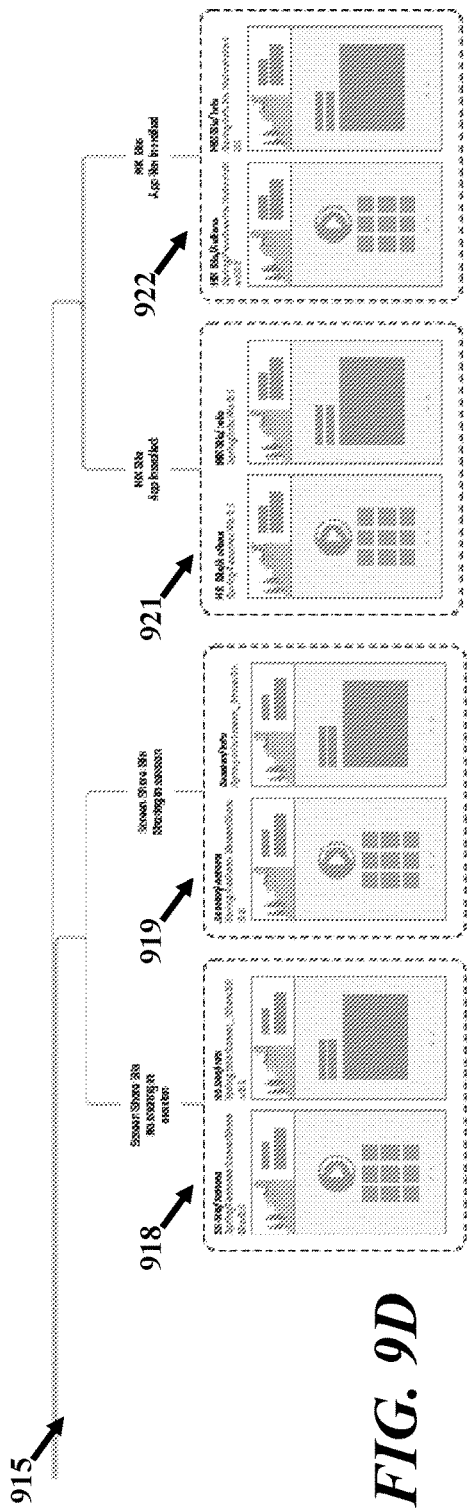
Figure 9E:
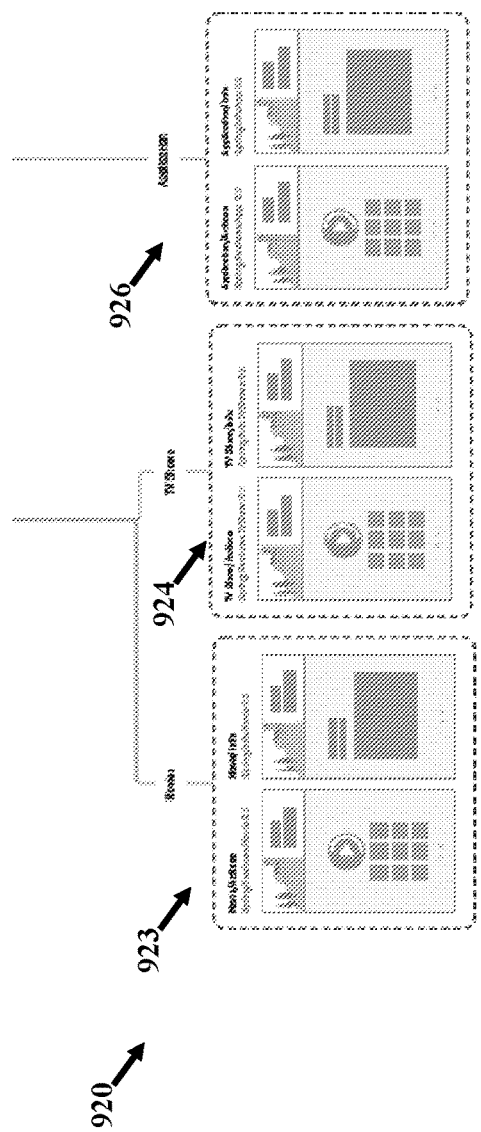
Figure 9F:
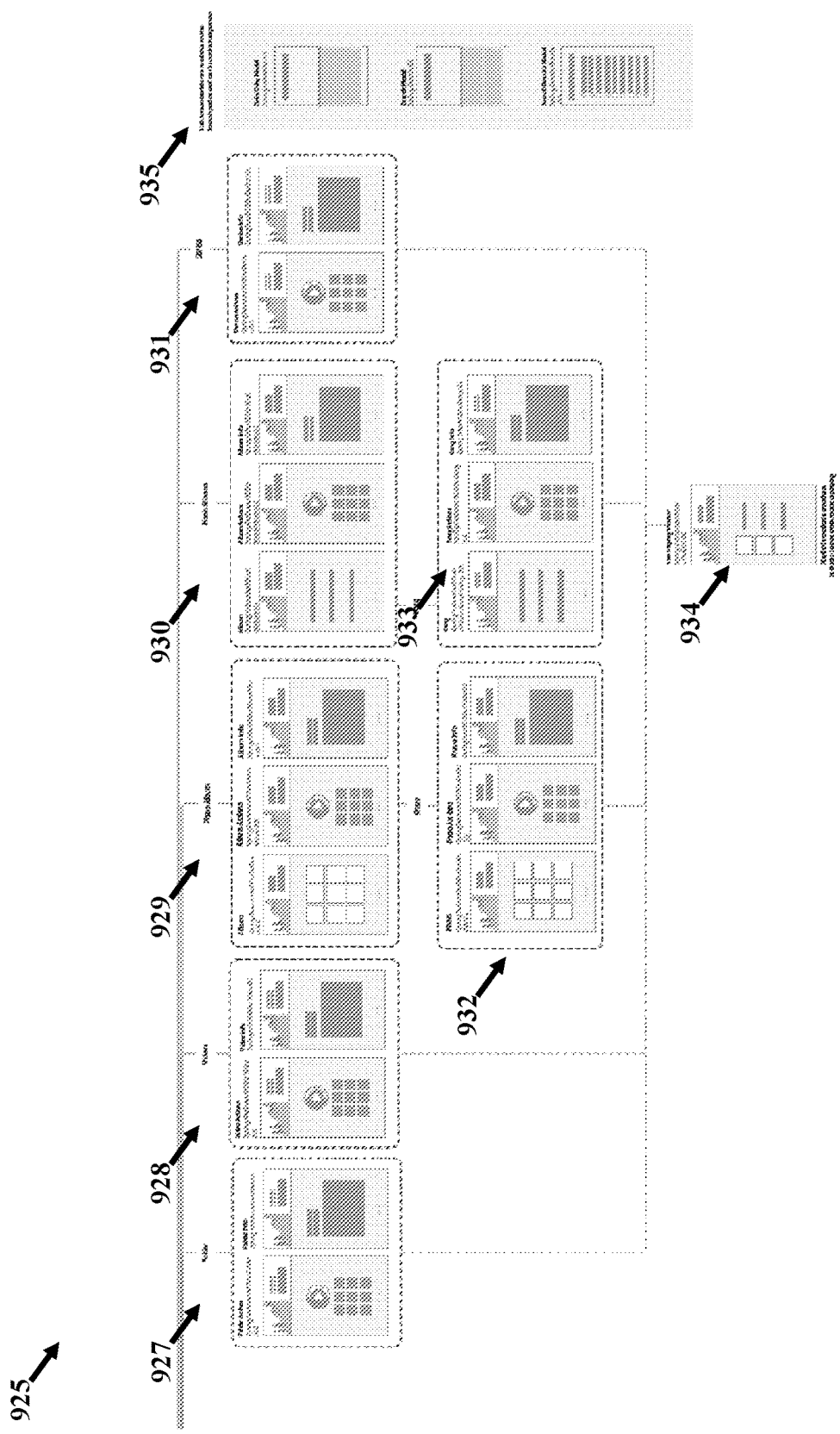

FIG. 9C depicts media silos 910 including silos for live TV with scanned channels 911, live TV without scanned channels 912, on-demand silo 911, app center silo 914, media center silo 916 and an input source silo 917. FIG. 9D depicts screen share and mix silos 915 including screen share silo without a screen sharing session 918, a screen share silo with a screen sharing session 919, mix silo with an app included 921 and mix silo without the app included 922. FIG. 9E depicts media content 920 including movies 923, TV shows 924, and applications 926. FIG. 9F depicts media center content 925 including folder 927, videos 928, photo album 929, music albums 930 and devices 931. Photo albums 928 may be based on individual photos 932. Similarly, music albums 930 may be based on song data 933 which may be associated with one or more playlists 934. Full screen modes 935 may be provided for presentation of content of FIGS. 9A-9F.

Figure 10:
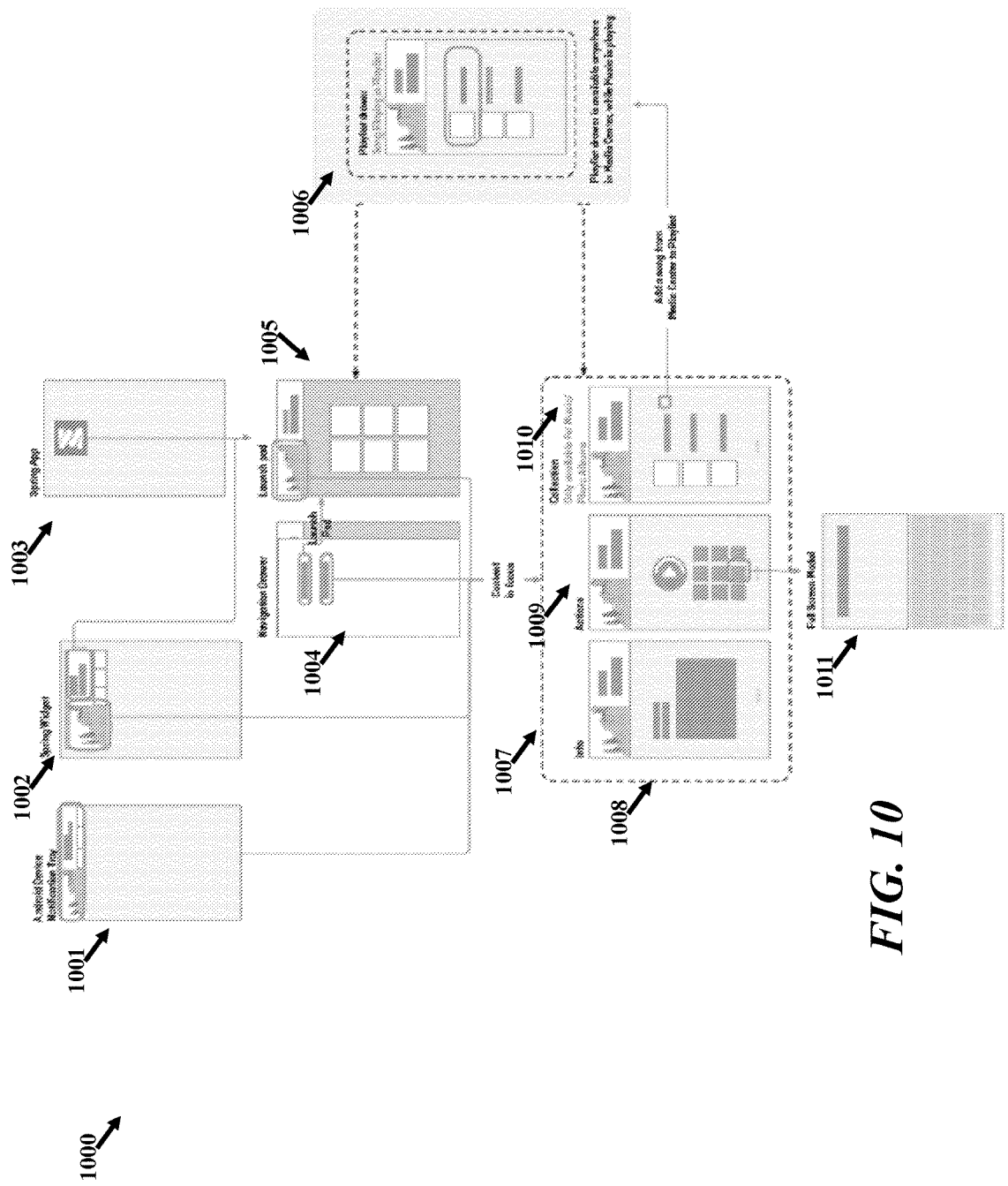
FIG. 10 depicts an exemplary screen flow according to one or more embodiments.

FIG. 10 depicts an exemplary screen flow according to one or more embodiments. Presentation of the spring app in process 1000 may be initiated by presentation of a notification tray at 1001, presentation of a spring widget at 1002, a spring app at 1003, a navigation drawer at 1004 and/or launch pad at 1005. In some cases presentation of playlist drawer 1006 may be provided whenever music is playing. Process 1001 may include presentation of content in focus at 1007, such as one or more of information 1008, actions 1009 and collection 1010 followed by a full screen mode 1011.

Figure 11:
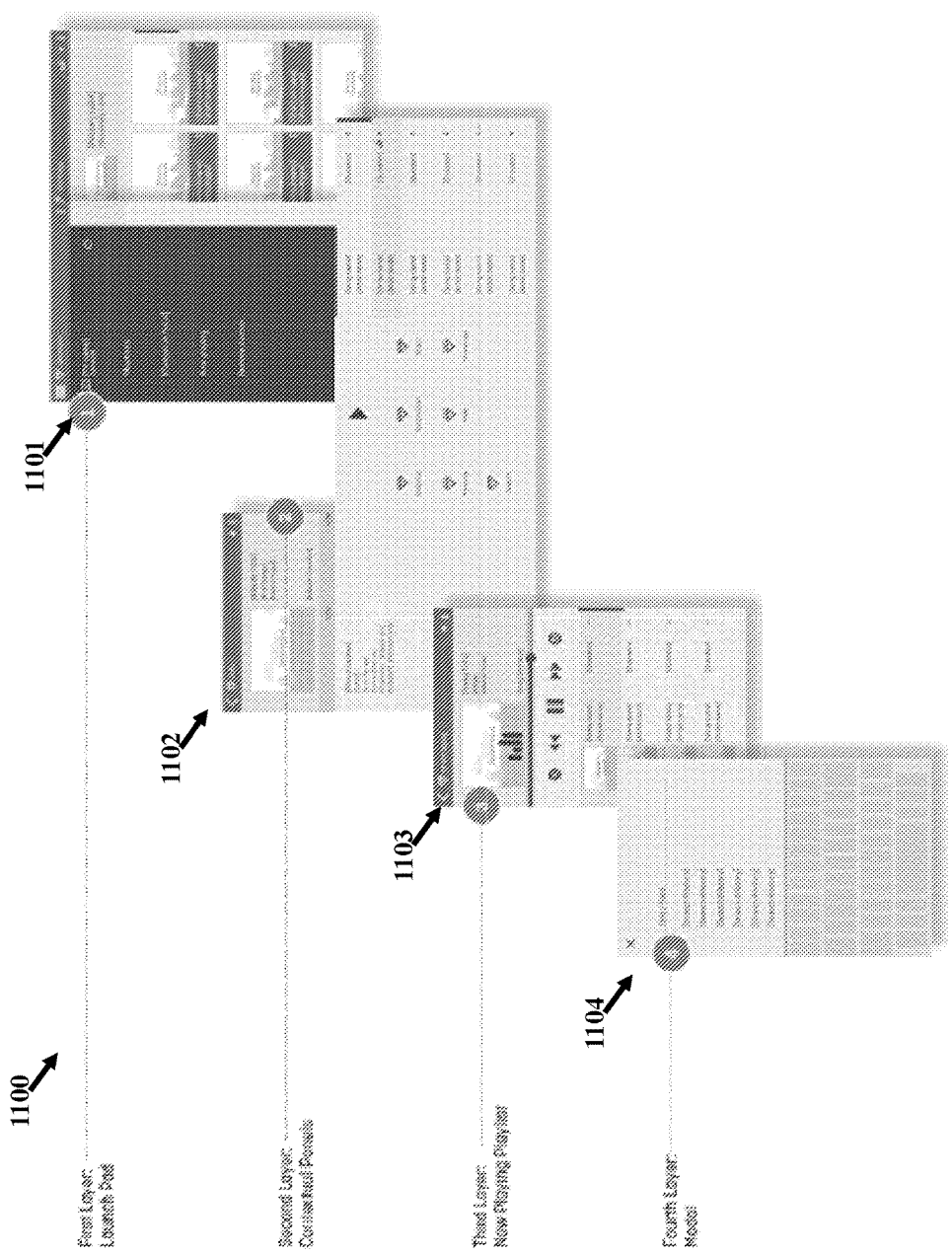
FIG. 11 depicts one or more panels of a spring application user interface according to one or more embodiments.

FIG. 11 depicts one or more panels of a spring application user interface. According to one embodiment, panels 1100 of the spring application may reside in four main layers. Launch pad and navigation layer 1101 is a first layer and access point to content in second layer 1102. Layer 1102 is a second layer including contextual panels with information, actions and albums. The third layer 1103 may be a now playing playlist. The fourth layer 1104 may be a modal layer to be called out from particular actions over every other panel.

Figure 12:
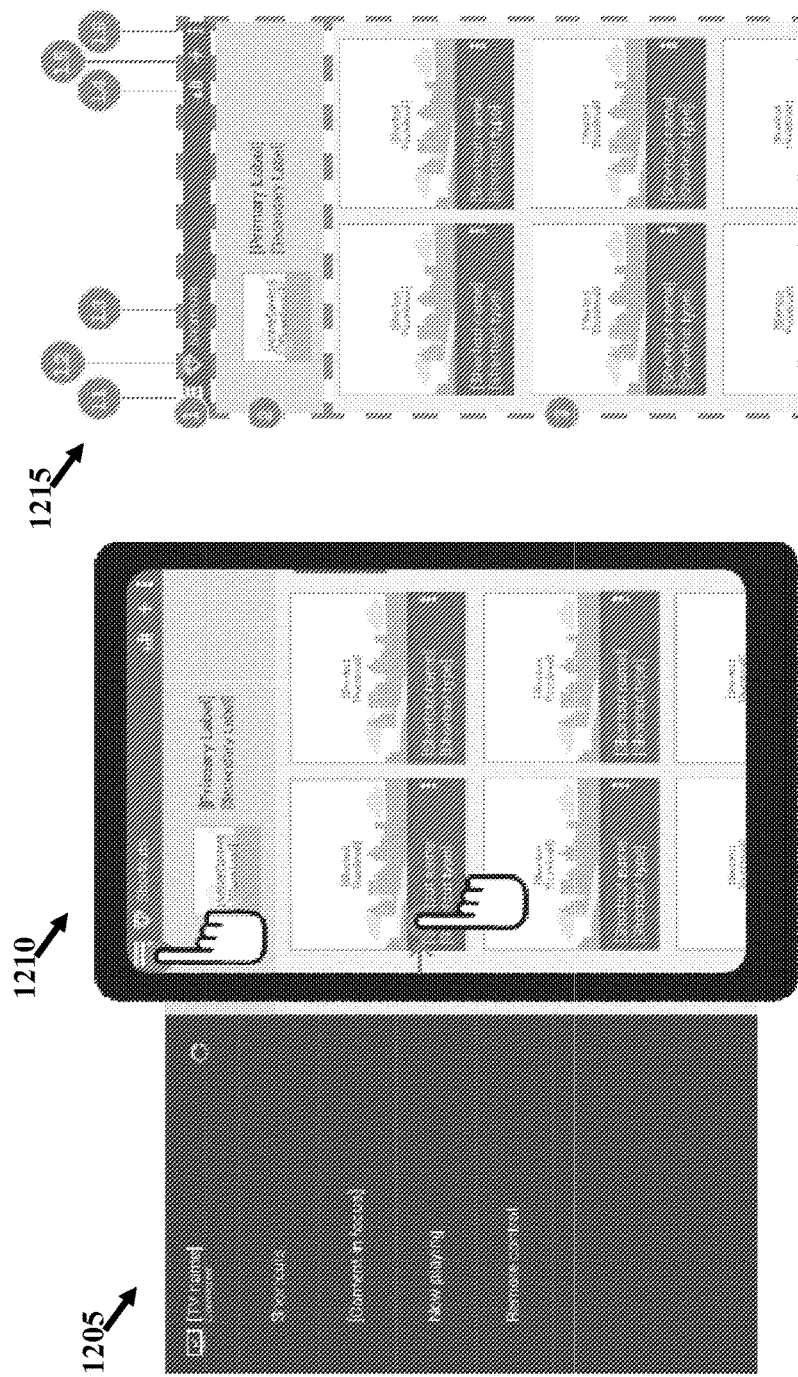
FIG. 12 depicts an exemplary representations of launch pad presentation according to one or more embodiments.

FIG. 12 depicts exemplary representations of launch pad presentation according to one or more embodiments. Spring application includes navigation drawer 1205 which may be accessible from the launch pad, the navigation drawer 1205 slides in as selected. The navigation drawer 1205 provides an option navigate to the content in focus or go back to the touch pad for global functionality that can be applied in the drawer. Launchpad 1210 includes shortcut items as well as links to content in focus. The launchpad 1210 and spring app can operate with navigation gestures such that a user can close the navigation drawer 1205 by tapping on the drawer in the action bar, by tapping shortcuts the user is taken to a specific location, and/or tapping in the item in focus can open up contextual panels. Swiping from an edge can provide one or more of opening the navigation drawer 1205 when the swiping from the left edge in the launch pad, or closing the navigation drawer 1205 by swiping from the right edge. A swipe up or down can allow for scrolling.

Features 1215 of launchpad 1210 may include an action bar, content in focus area, shortcut collection and navigation drawer 1205. The action bar may sit on top of both the launch pad 1210 and the navigation drawer 1205 and includes: navigation drawer icons, a logo, panel tile shortcuts, now playing indicator, shortcut quick add to create a shortcut in focus and an overflow menu. The content focus area of launch pad 1215 is in sync with content currently played or displayed by the display device. A thumbnail of the content may be showed in focus with primary information such as a name, type and date.

Figure 13:
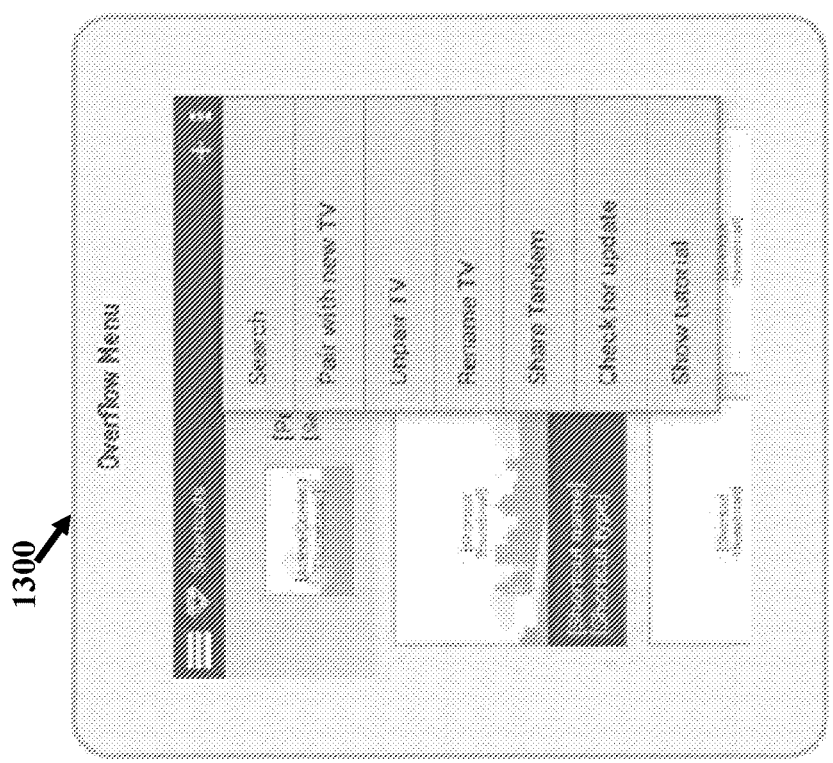
FIG. 13 depicts a graphical representation of an action bar overflow menu according to one or more embodiments.

FIG. 13 depicts a graphical representation of an action bar overflow menu according to one or more embodiments. Over flow menu 1300 may include one or more of a search function, pair with new TV, Rename TV, Unpair TV, Share App, Check for Updates and Show tutorial features. The search function may launch data entry elements on the device to initiate a global search. Par with new TV triggers a pairing process. Rename TV enables personalization of the TV's name. Unpair the TV allows the device to disconnect from the TV. Share App allows a means to share the app and network connection with one or more other users. Check for update allows a means to check for spring app updates. Start a tutorial launches an app tutorial.

Figure 14:
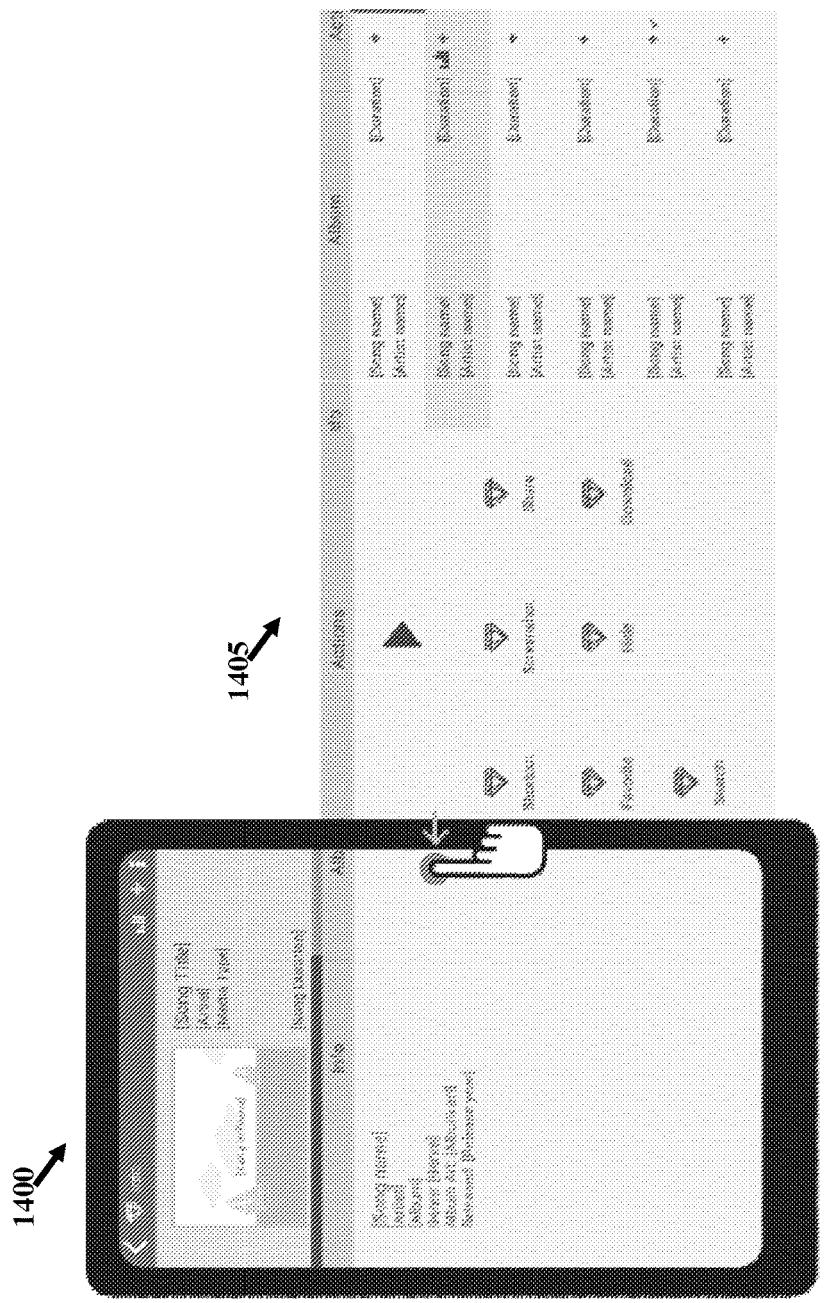
FIG. 14 depicts a graphical representation of contextual panels according to one or more embodiments.

FIG. 14 depicts a graphical representation of contextual panels according to one or more embodiments. Presentation 1400 of the spring app may include presentation of a contextual panel 1405. Contextual panel 1405 may be in the same hierarchy as when a user selects content in focus. Contextual panels can be provided for information (e.g., contextual information about the content in focus), actions (e.g., contextual actions for the content in focus), and albums (e.g., an exclusive collection of albums which may include a grid view for albums and a list view).

Figure 15:
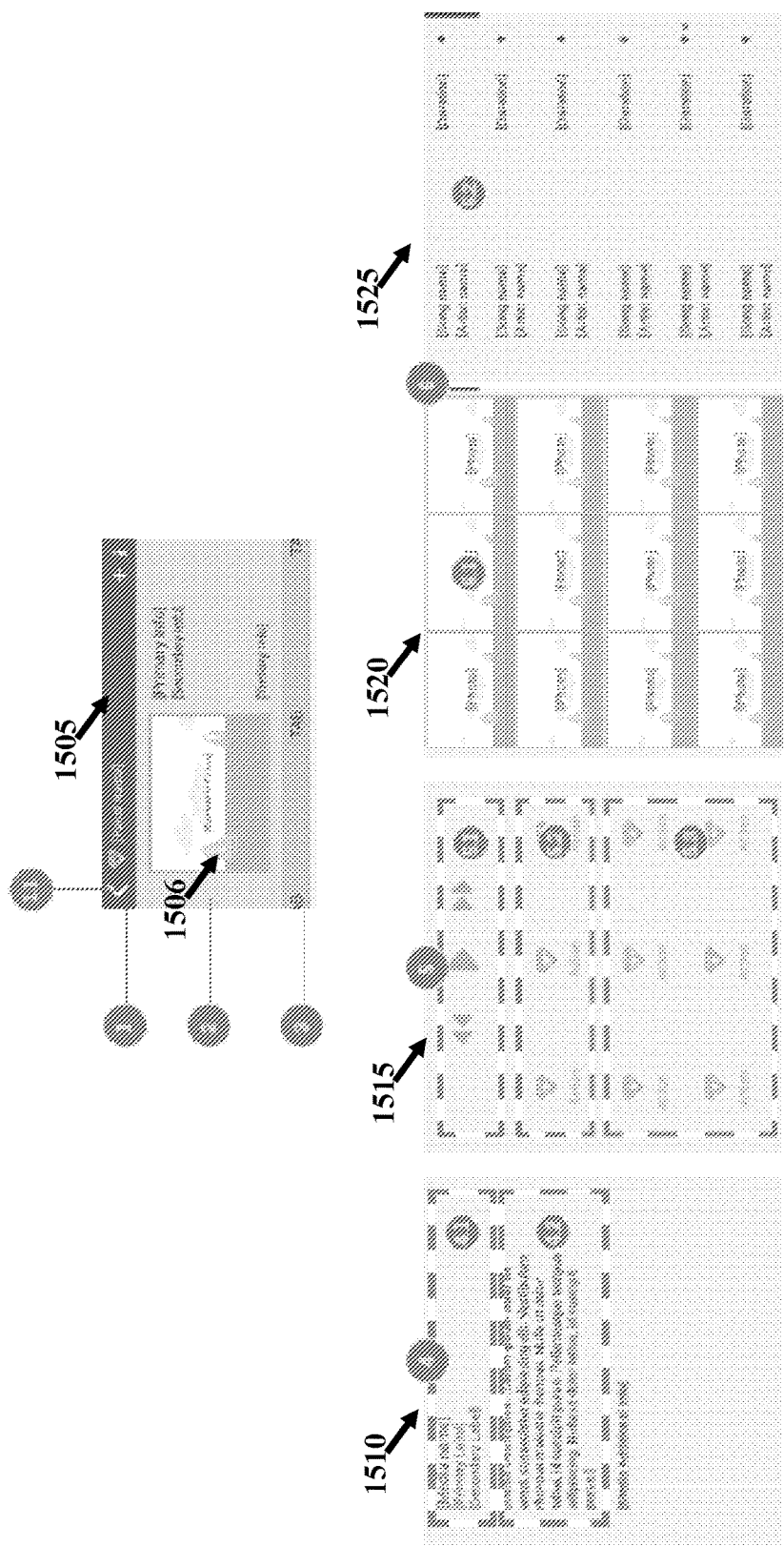
FIG. 15 depicts a graphical representation of contextual panels according to one or more other embodiments.

FIG. 15 depicts a graphical representation of contextual panels according to one or more other embodiments. A contextual panel may include one or more features including an action bar, content in focus area, a tab bar, info panel, actions and albums. Action bar 1505 may sit on top of the contextual panel and can take a user back to a launch pad. Content in focus area 1506 may include a thumbnail image of the content in focus and a name, type, etc. Information panel 1510 includes general information about the content in focus, such as primary information or secondary information. Actions 1515 allows for playback, global actions and/or media specific actions. Actions 1515 may be tailored or selected based on the media type. Albums 1520 are shown in grid view. Albums 1525 are shown in list view.

Figure 16:
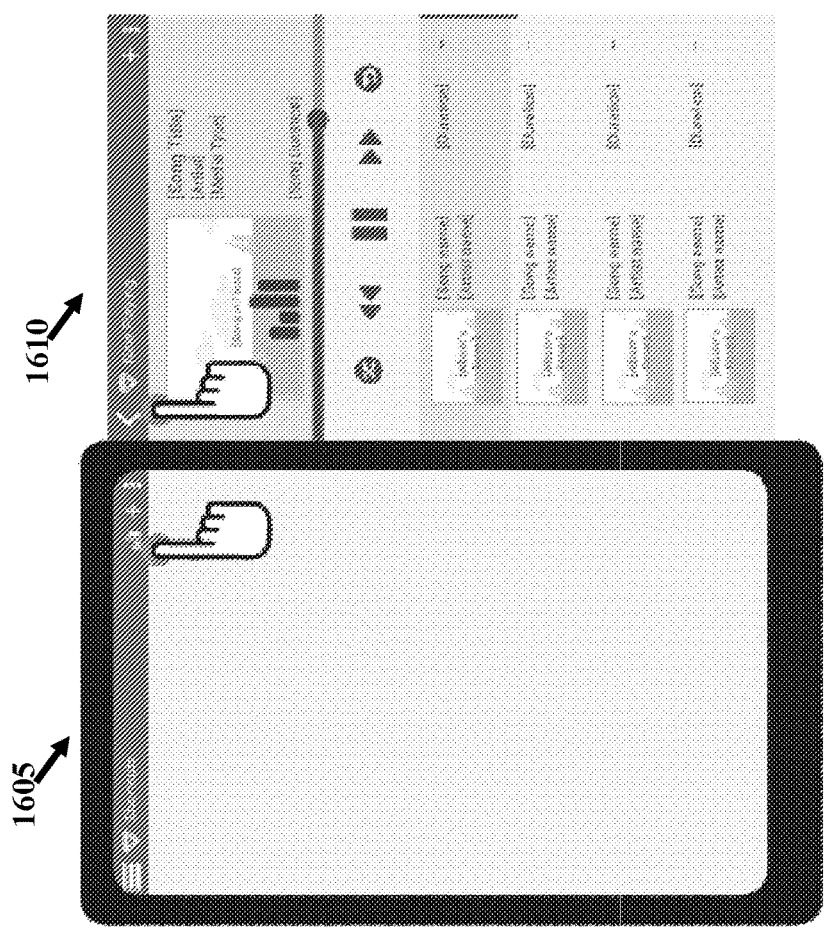
FIG. 16 depicts a graphical representation of a now playing playlist according to one or more embodiments.

FIG. 16 depicts a graphical representation of a now playing playlist according to one or more embodiments. Action bar selection is shown as 1605 to trigger presentation of now playing playlist 1610. The now playing playlist may only be available in some embodiments when a user is in a media center of a display device. The drawer for the now playing playlist may be available when an indicator appears in an action bar, during playback of a song and a selection is made to add a song to the playlist. A touch command or tap of the playlist may open up the playlist. Similarly, swipe commands may open and close the playlist.

Figure 17:
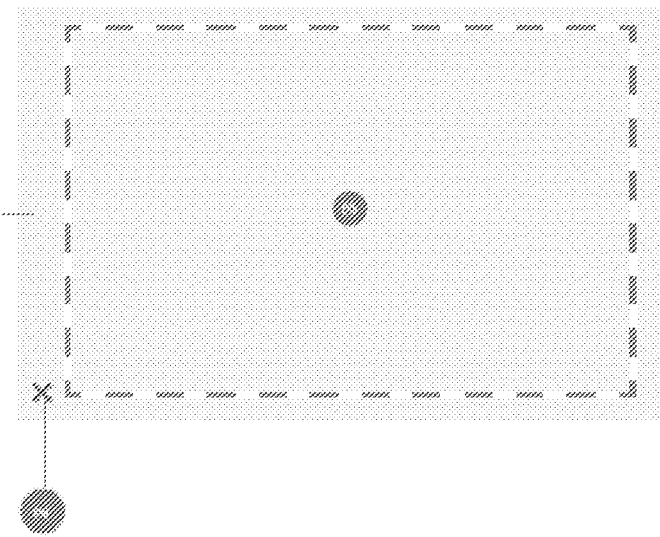
FIG. 17 depicts a graphical representation of a full screen mode according to one or more embodiments.

FIG. 17 depicts a graphical representation of a full screen mode according to one or more embodiments. Full screen mode 1700 may fill up the screen of the display panel and overlay all panels. Modal content presented may be triggered based on the command to present in a full screen mode. For example, if the full screen mode is triggered by a search, a data entry field and search history may be provided by the spring application.

Figure 18:
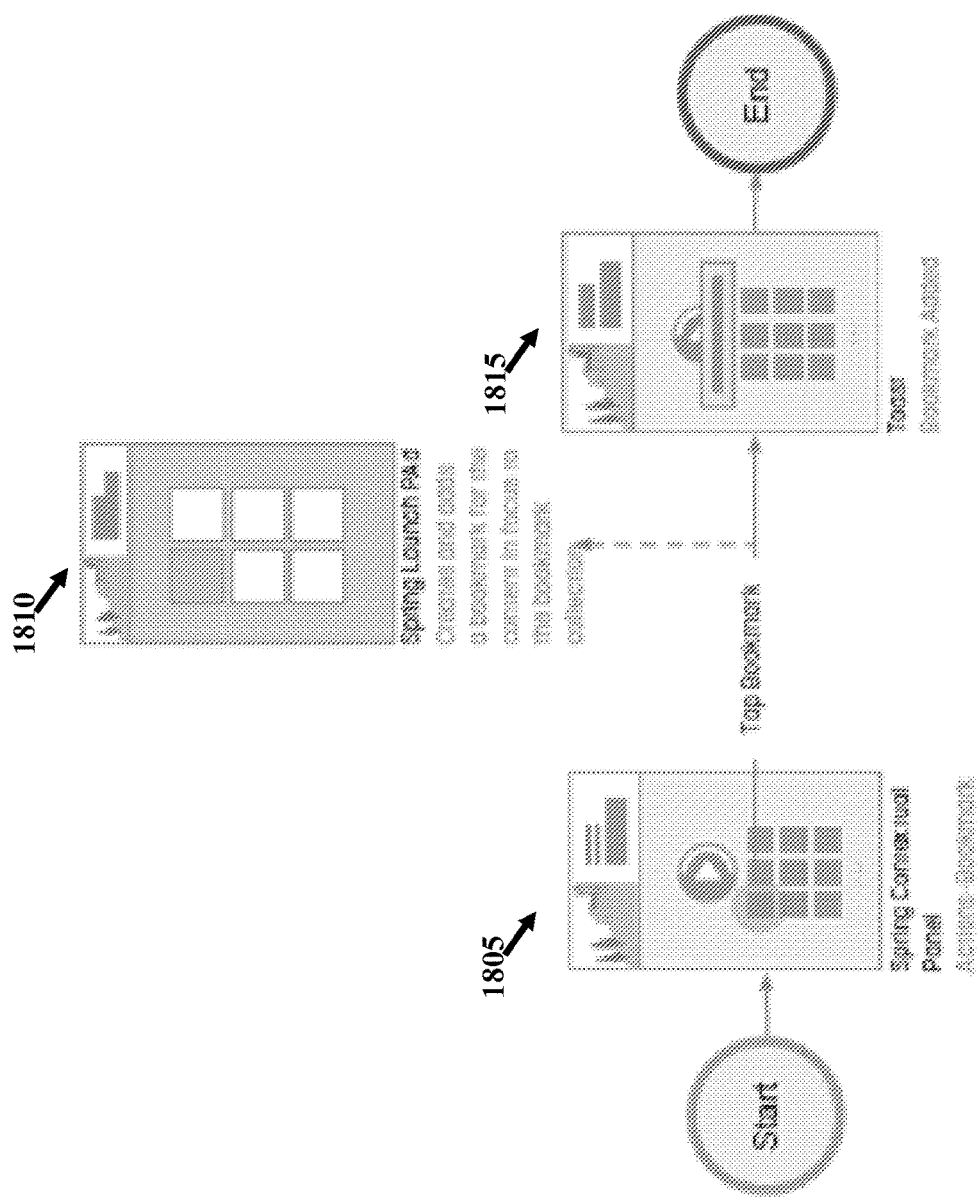
FIG. 18 depicts a process for creating a direct link, or shortcut, for content in focus and adding the link to a shortcut collection of the launch pad according to one or more embodiments.

According to another embodiment, the spring application may provide for one or more global actions. FIG. 18 depicts a process for creating a direct link, or shortcut, for content in focus and adding the link to a shortcut collection of the launch pad according to one or more embodiments. Process 1800 includes display of a spring contextual panel 1805, selection 1810 for creation of a bookmark from the launchpad, and addition of the bookmark to the launch pad 1815.

Figure 19:
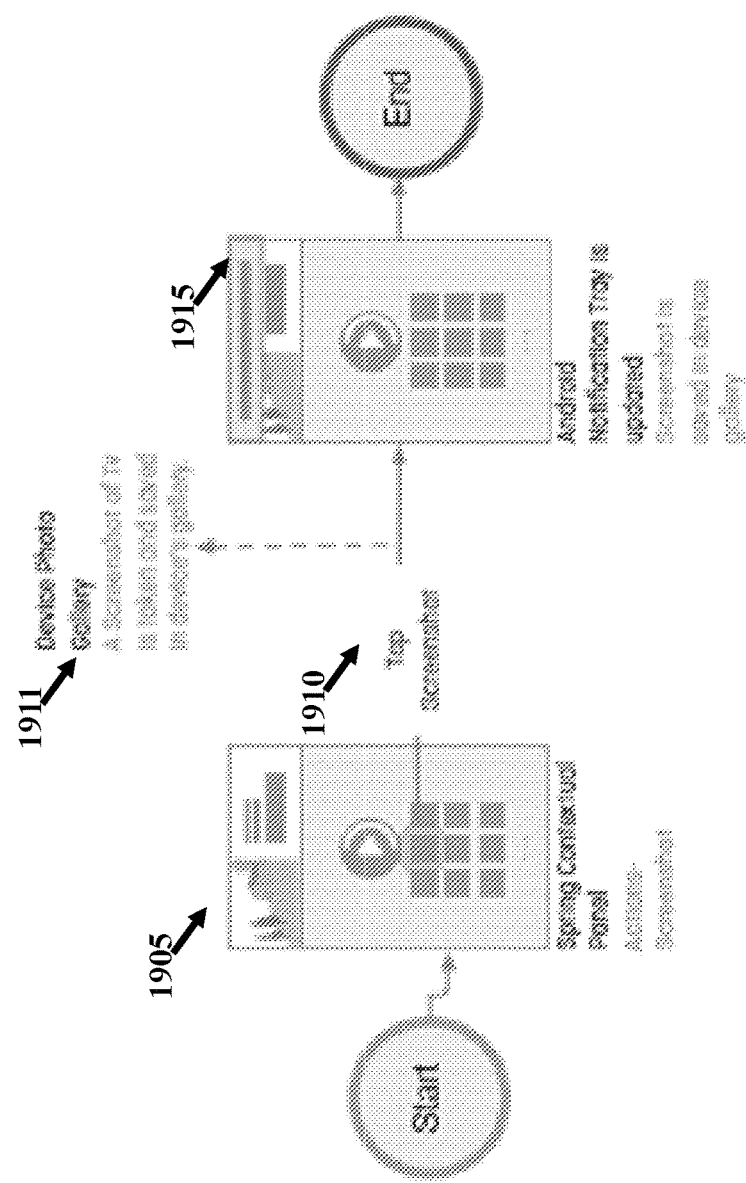
FIG. 19 depicts a process for taking a screen shot according to one or more embodiments.

FIG. 19 depicts a process for taking a screen shot according to one or more embodiments. Process 1900 includes display of a spring contextual panel 1905, selection 1910, which may be a screen tap, for creation of a screen shot from the launchpad, and addition of the image data to the photo gallery at block 1911 to the launch pad. At block 1915, a notification tray may be updated.

Figure 20:
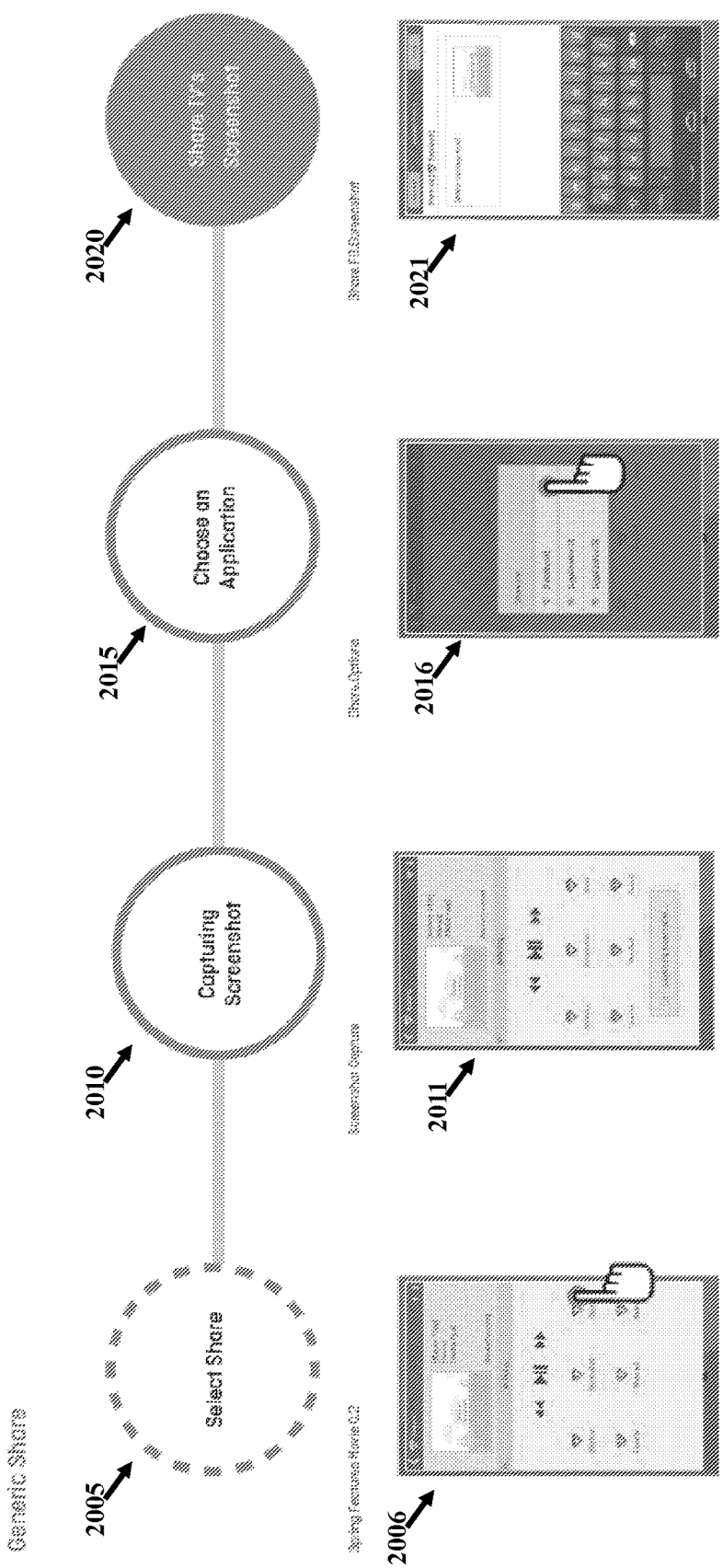
FIG. 20 depicts a graphical representation of a sharing operation according to one or more embodiments.

FIG. 20 depicts a graphical representation of a sharing operation. At block 2005 a share selection 2006 on an action panel can share a screen shot when tapped. At block 2010 the screenshot is captured and the screen shot of the display device is downloaded to a companion or user device shown by screenshot capture 2011. An application may be chosen for sharing the image data at block 2015 wherein the spring app provides a user with choices 2016 to share the image data. At block 2020 the TV screenshot is shared and the spring application allows for a user to add a message to the image at 2021.

Figure 21:
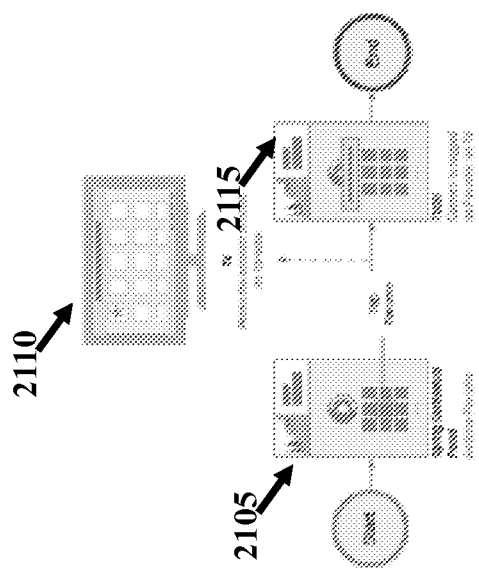
FIG. 21 depicts a favorite function for media according to one or more embodiments.

According to another embodiment, the spring application may provide media specific functions. FIG. 21 depicts a favorite function for media. Process 2100 may be employed by the spring application to set active content as a favorite item. At 2105 a spring connection panel is displayed and favorite is tapped. The display device updates the presentation to indicate a favorite is selected at 2110 and the spring application on the companion device updates the presentation to indicate selection of a favorite at 2115.

Figure 22:
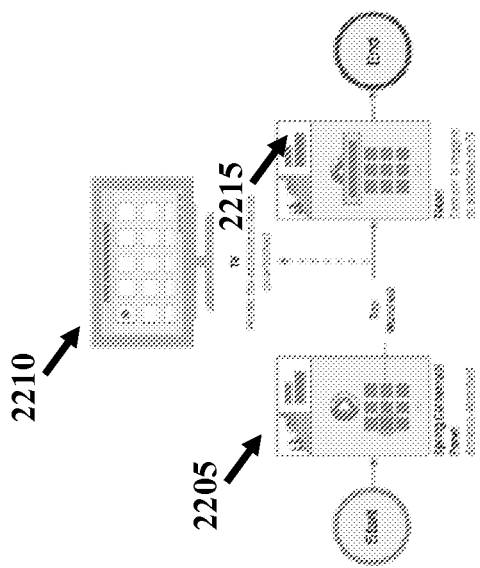
FIG. 22 depicts a watched function for media according to one or more embodiments.

FIG. 22 depicts a watched function for media. Process 2200 may be employed by the spring application to set active content as a watched item. At 2205 a spring connection panel is displayed and watched is tapped. The display device updates the presentation to indicate a media is marked as watched at 2210 and the spring application on the companion device updates the presentation to indicate selection of a watched item at 2215.

Additional media functions may include a download function to allow the spring application to download media to a companion device. In certain embodiments, the spring application will block downloads for protected material. Other functions include hiding media or content, enabling/disabling closed captures and subtitles, uninstalling apps from an app database and renaming the input source of a display device.

Figure 23:
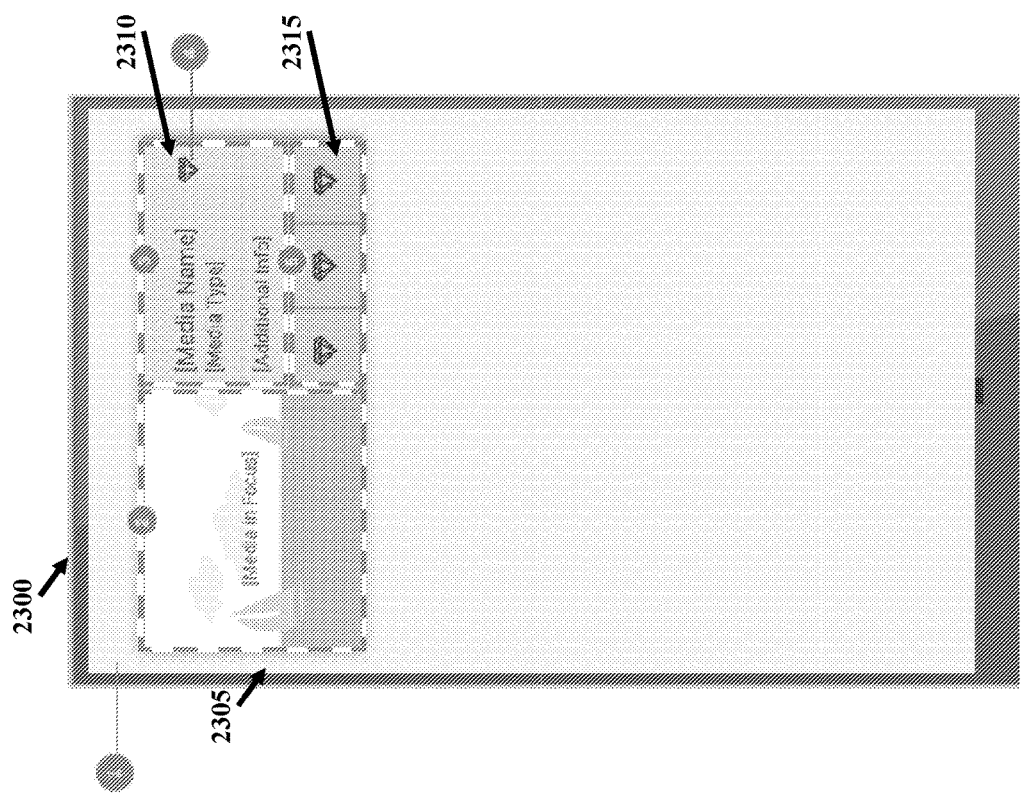
FIG. 23 depicts a graphical representation of a spring application widget according to one or more embodiments.
Figures 24, 25:
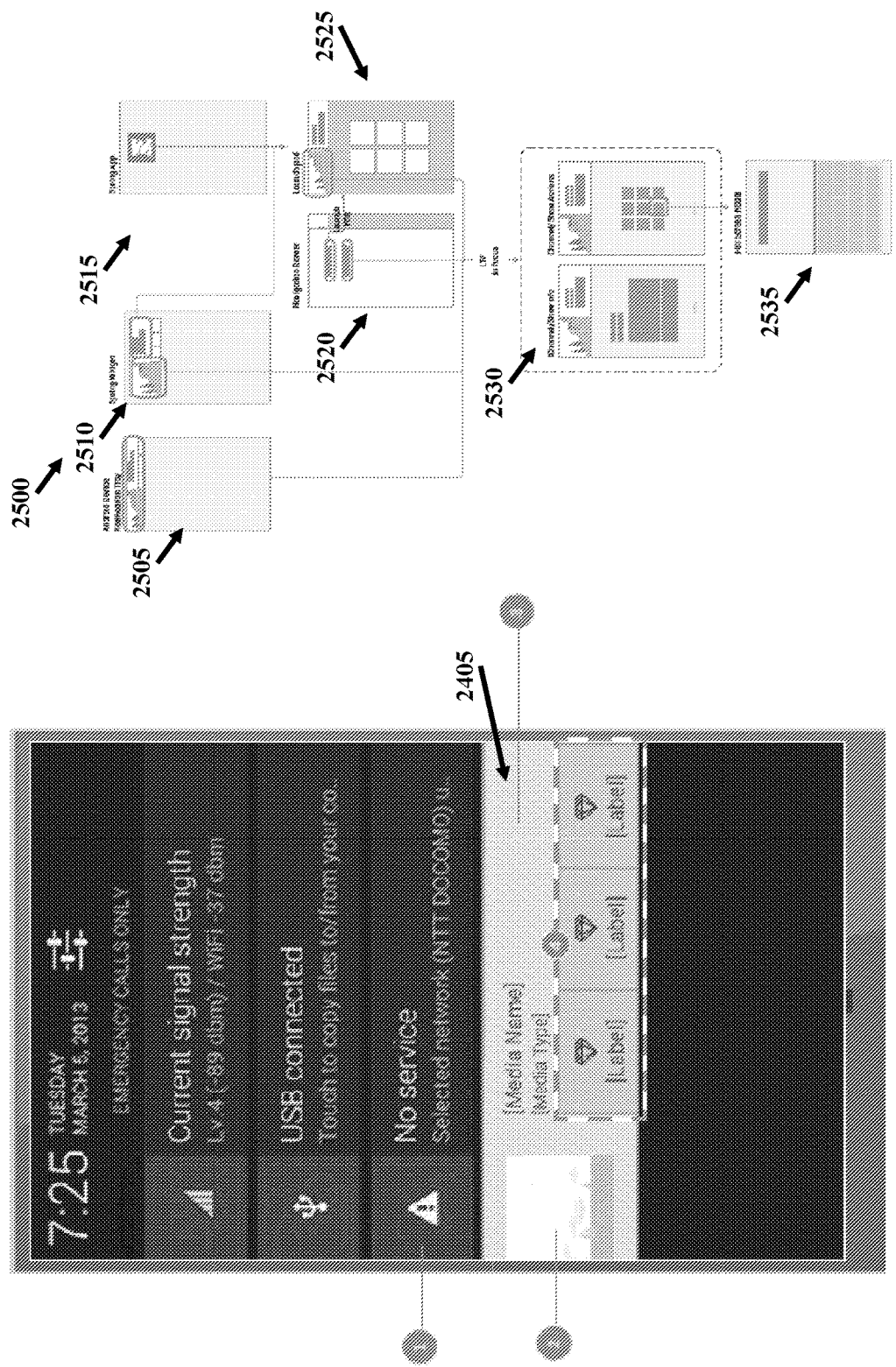
FIG. 24 depicts a graphical representation of a spring application widget according to one or more embodiments.
FIG. 25 depicts a process for presentation of contextual panels according to one or more embodiments.

FIG. 23 depicts a graphical representation of a spring application widget. According to one embodiment, a widget is a minimal version of the spring app that may be placed on the desktop or user interface screen of a mobile device. Widget 2305 may be displayed on device desktop/user interface screen 2300. Shortcuts icons 2310 may be included in widget 2305 as will action buttons 2315 which may be used to interact with content in the focus of TV. The spring application widget can be displayed on mobile device's screen as shown in FIG. 24. Widget 2405 occupies a portion of the display window but may be configured to provide the same or similar features of the spring application.

FIG. 25 depicts a process for presentation of contextual panels according to one or more embodiments. According to one embodiment, contextual panels based on the media presented by a display device. FIG. 25 depicts presentation of contextual panels for live TV, however it should be appreciated that contextual panels may be presented for other forms of media. Process 2500 can include presentation of the spring application as one or more of a notification tray 2502, spring widget 2510 or spring app icon 2515. Based on user operation, operation of a navigation drawer 2520 or launch pad 2525, the spring application may display contextual panels 2530 based on the user operation. Presentation of the contextual panels may also be based on the media that is presented. With live TV for example, contextual panels 2530 may include one or more actions for the broadcast program. Based on a user action the spring application may display full-screen modal view 2535.

Figure 26B:
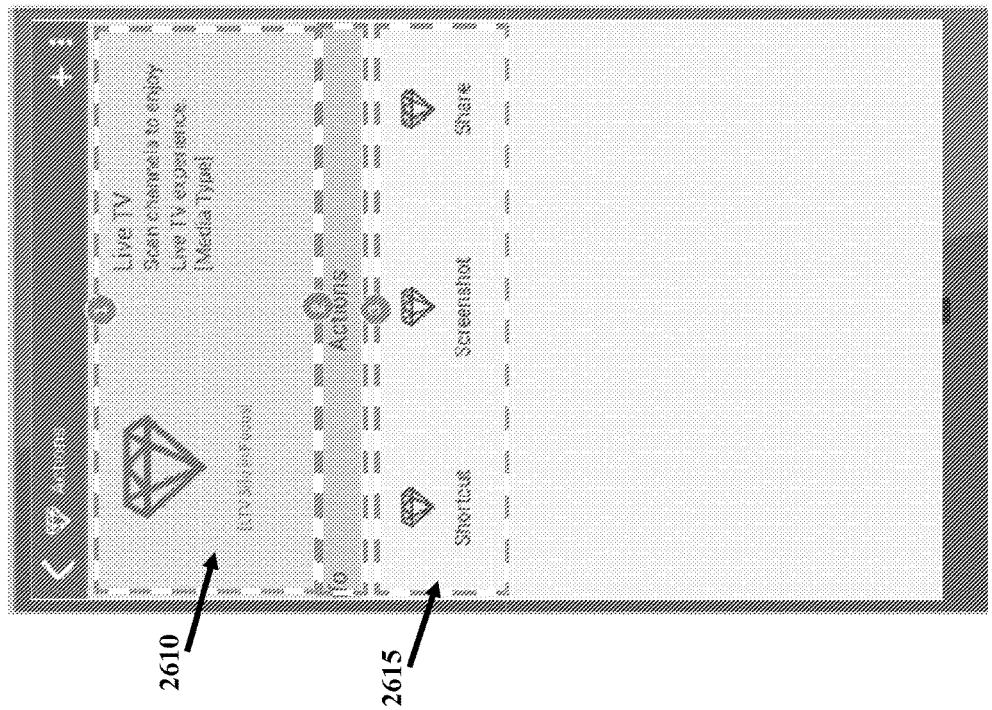
FIGS. 26A-26D depict exemplary configurations for contextual panel presentation by a spring application according to one or more embodiments.
Figure 26A:
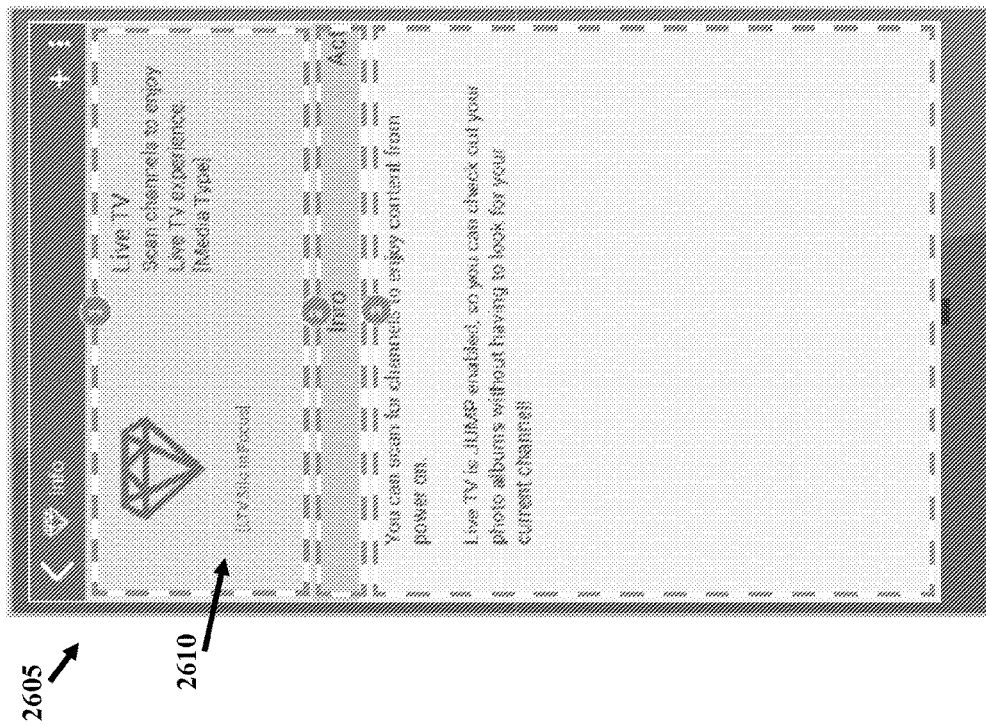
Figure 26D:
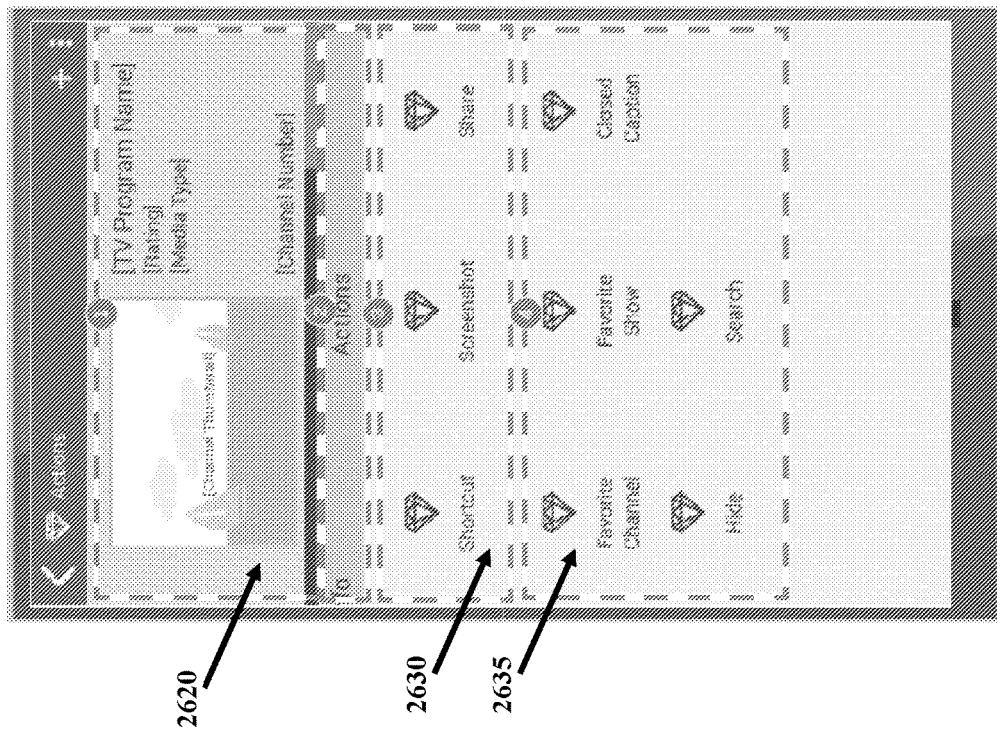
Figure 26C:
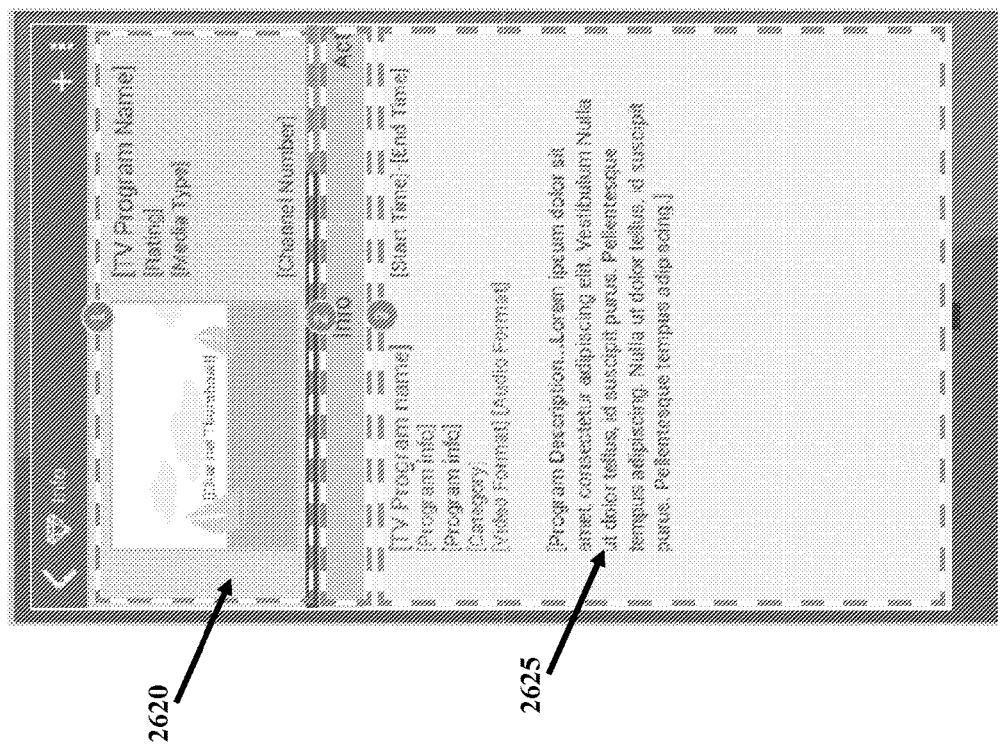

FIGS. 26A-26D depict exemplary configurations for contextual panel presentation by a spring application according to one or more embodiments. FIG. 26A depicts presentation of a spring app 2605 including focus area 2610 to identify a silo icon, silo name and message. FIG. 26B depicts global actions 2615 including shortcut, screenshot and share functionality that may be selected by a user. FIG. 26C depicts focus area 2620 including a focus area for a broadcast program and program information 2625. FIG. 26D depicts context panels 2630 for global actions and panel 2635 for media specific actions such as favorite channel, favorite show, close caption, hide, search, etc.

While contextual presentation in FIGS. 26A-26D depict presentation of context panels for live broadcast TV, it should be appreciate that context panels may be presented for other forms of media, including video on demand (VOD), media center content, music and image data.

Figure 27B:
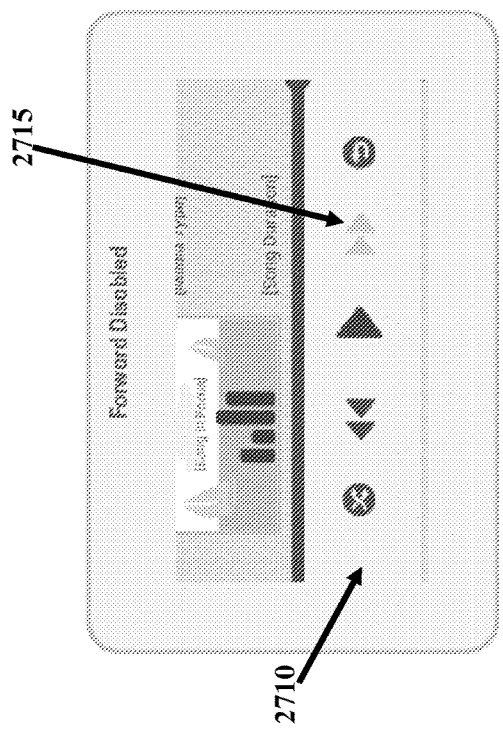
FIGS. 27A-27B depict a graphical representation of a spring application and playback controls according to one or more embodiments.
Figure 27A:
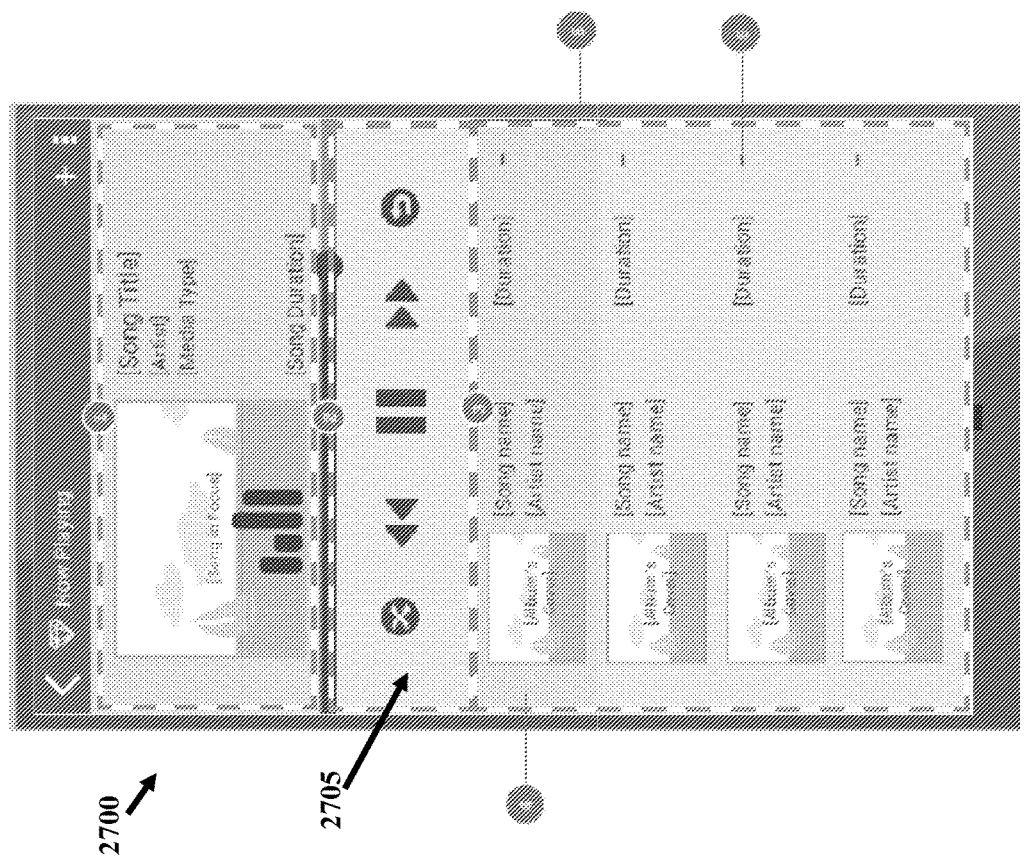

FIGS. 27A-27B depict a graphical representation of a spring application and playback controls according to one or more embodiments. FIG. 27A depicts spring application 2700 including playback controls 2705. According to one embodiment, playback controls may be disabled and/or modified based on the type of media, the stage of playback, applicability of the commands. By way of example, FIG. 27B depicts playbacks commands 2710 wherein playback command 2715 is displayed as being disabled and is inoperable. Playback command 2715 may relate to a forward or next track command and may be disabled, for example, when there is not an additional track to be played.

Figure 28:
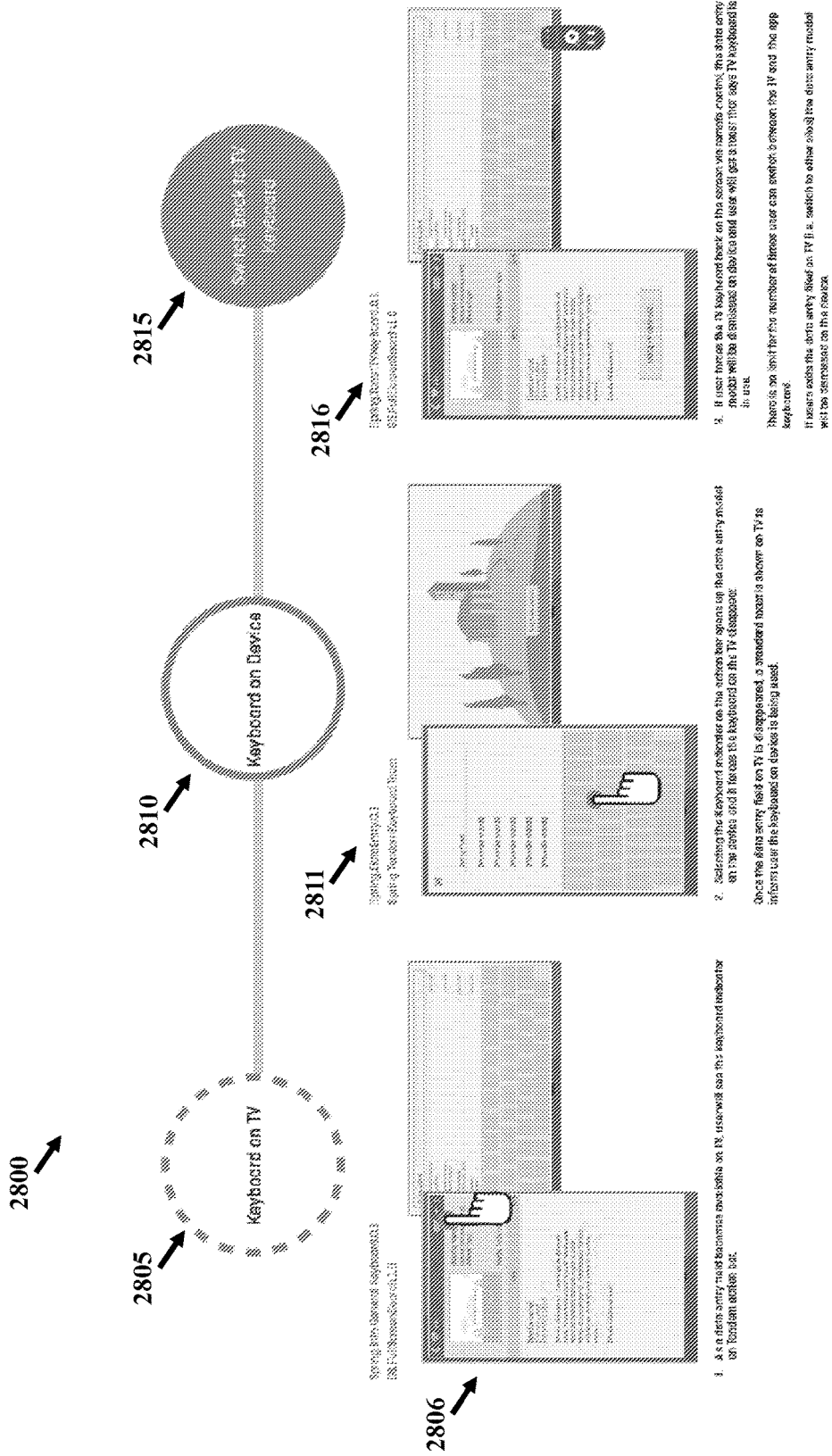
FIG. 28 depicts a process for providing a keyboard on a device according to one or more embodiments.

FIG. 28 depicts a process for providing a keyboard on a device according to one or more embodiments. Process 2800 allows for a keyboard to be display by a device (e.g., device 110). In certain embodiments, a display device (e.g., display device 105) may display a keyboard to allow a user to enter a text string or characters for operation of the display device, such as presentation of a data entry field on 2806. At 2810, the keyboard will be presented on a device, such as a companion device or mobile device separate from the display device to including a data entry modal 2811 to allow for data entry of text and or other characters. At 2815, the spring application can switch back to the display device keyboard including presentation 2816 of the data entry on the display device. According to one embodiment, there is no limit to the amount of times that the data entry can be switched from the display device to the companion device, or from the companion device to the display device.

While this disclosure has been particularly shown and described with references to exemplary embodiments thereof, it will be understood by those skilled in the art that various changes in form and details may be made therein without departing from the scope of the claimed embodiments.

What is claimed is:

1. A method for presentation of a user interface associated with content presented by a display device, the method comprising:
running an application by a device, wherein the application is configured to present a user interface based on active content displayed by a display device;
receiving, by the device, data from the display device, wherein the data includes contextual information associated with the active content displayed by the display device, and wherein the device connects to the display device to receive information associated with active content displayed by the display device; and
presenting a user interface on the device by the application based on contextual information received from the display device and separate from the active display of the display device, wherein the user interface is presented on the device including a configuration to provide contextual content that is independent from a display configuration of the active content displayed by the display device, wherein graphical elements and functions of the user interface on the device are presented based on the active content displayed by the display device, a type of the content displayed by the display device and contextual content available for the content displayed by the display device, wherein graphical elements of the user interface are selectable to generate commands for the display device and wherein the user interface is configured to present a menu bar configured to switch between user interface configurations including
  a configuration configured to launch presentation of content, and
  a configuration based on the active content displayed by the display device,
wherein the configuration based on active content is presented with at least one contextual panel including at least one function for the application determined based on the type of active content and a graphical element for the at least one function, wherein presentation of the graphical element for the at least one function is based on the applicability of the function with the active content.

2. The method of claim 1, wherein the application is a spring application configured to pair the device with the display device, and to provide commands to the display device based on operation of a user interface presented on the device.

3. The method of claim 1, wherein running the application includes executing the application to initiate pairing of the device with the display device.

4. The method of claim 1, wherein the application provides contextual functionality by tailoring functions of the application and presentation of graphical elements based at least in part on one or more of a particular content title and a type of media associated with the content title.

5. The method of claim 1, wherein receiving data includes receiving metadata for active content presented by the display device.

6. The method of claim 1, wherein presenting the application includes presenting one or more graphical elements to provide quick access to playback of content on the display device.

7. The method of claim 1, wherein presentation of the application includes configuration of the user interface based on one or more contextual features associated with content presented by the display device, wherein contextual information for content displayed by the display device is presented as information elements on the device by the application.

8. The method of claim 1, wherein presentation of the application includes a presentation of a plurality of graphical elements that are selectable to initiate playback of a particular content title stored as a bookmark for the application.

9. The method of claim 1, further comprising outputting a control command by the application for the display device to control operation of the display device, wherein the control command is generated based on a detected user input to the application on the device.

10. The method of claim 1, further comprising storing at least one of image and media data by the application on the device, wherein the at least one image and media data generated from content presented by the display device.

11. A system comprising:
  a display device configured to present content; and
  a device coupled to the display device, wherein the device is configured to run an application, wherein the application is configured to present a user interface based on active content displayed by a display device;
    receive data from the display device, wherein the data includes contextual information associated with the active content displayed by the display device, and wherein the application is configured to provide information associated with content displayed by a display device and one or more control functions based on the data to the device; and
    present a user interface by the application based on contextual information received from the display device and separate from the active display of the display device, wherein the user interface is presented on the device including a configuration to provide contextual content that is independent from display configuration of the content displayed by the display device, wherein graphical elements and functions of the user interface on the device are presented based on the active content displayed by the display device, a type of the content displayed by the display device and contextual content available for the content displayed by the display device, wherein graphical elements of the user interface are selectable to generate commands for the display device and
    wherein the user interface is configured to present a menu bar configured to switch between user interface configurations including
      a configuration configured to launch presentation of content, and
      a configuration based on the active content displayed by the display device,
      wherein the configuration based on active content is presented with at least one contextual panel including at least one function for the application determined based on the type of active content and a graphical element for the at least one function, wherein presentation of the graphical element for the at least one function is based on the applicability of the function with the active content.

12. The system of claim 11, wherein the application is a spring application configured to pair the device with the display device, and to provide commands to the display device based on operation of a user interface presented on the device.

13. The system of claim 11, wherein running the application includes executing the application to initiate pairing of the device with the display device.

14. The system of claim 11, wherein the application provides contextual functionality by tailoring functions of the application and presentation of graphical elements based at least in part on one or more of a particular content title and a type of media associated with the content title.

15. The system of claim 11, wherein receiving data includes receiving metadata for active content presented by the display device.

16. The system of claim 11, wherein presenting the application includes presenting one or more graphical elements to provide quick access to playback of content on the display device.

17. The system of claim 11, wherein presentation of the application includes configuration of the user interface based on one or more contextual features associated with content presented by the display device, wherein contextual information for content displayed by the display device is presented as information elements on the device by the application.

18. The system of claim 11, wherein presentation of the application includes a presentation of a plurality of graphical elements that are selectable to initiate playback of a particular content title stored as a bookmark for the application.

19. The system of claim 11, wherein the device is further configured to output a control command by the application for the display device to control operation of the display device, wherein the control command is generated based on a detected user input to the application on the device.

20. The system of claim 11, wherein the device is further configured to store at least one of image and media data by the application on the device, wherein the at least one image and media data generated from content presented by the display device.

21. A method for presentation of a user interface associated with content presented by a display device, the method comprising:
   running an application by a device, wherein the application is configured to present a user interface based on active content displayed by a display device;
   receiving, by the device, data from the display device, wherein the data includes contextual information is associated with the active content displayed by the display device, and wherein the device connects to the display device to receive information associated with active content displayed by the display device; and
   presenting a user interface on the device by the application based on contextual information received from the display device and separate from the active display of the display device, wherein graphical elements and functions of the user interface on the device are presented based on the active content displayed by the display device, a type of the content displayed by the display device and contextual content available for the content displayed by the display device, wherein graphical elements of the user interface are selectable to generate commands for the display device and
   wherein the user interface is configured to present a menu bar configured to switch between user interface configurations including
      a configuration configured to launch presentation of content, and
      a configuration based on the active content displayed by the display device,
      wherein the configuration based on active content is presented with information about the content displayed by the display device including at least one contextual panel including at least one function for the application determined based on the type of active content, and wherein the information about the content is not displayed by the display device and a graphical element for the at least one function, wherein presentation of the graphical element for the at least one function is based on the applicability of the function with the active content.

* * * * *